United States Patent
Oishi

(10) Patent No.: US 8,717,584 B2
(45) Date of Patent: May 6, 2014

(54) IMAGE PROCESSING APPARATUS AND CONTROL METHOD THEREOF

(75) Inventor: Tetsu Oishi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 983 days.

(21) Appl. No.: 12/392,354

(22) Filed: Feb. 25, 2009

(65) Prior Publication Data

US 2009/0213425 A1    Aug. 27, 2009

(30) Foreign Application Priority Data

Feb. 25, 2008 (JP) .................. 2008-043551

(51) Int. Cl.
*G06F 3/12* (2006.01)
*G06F 1/00* (2006.01)
*G06K 15/00* (2006.01)

(52) U.S. Cl.
USPC ............................ 358/1.13; 358/1.9; 358/1.16

(58) Field of Classification Search
CPC combination set(s) only.
See application file for complete search history.

(56) References Cited

U.S. PATENT DOCUMENTS

| | | | |
|---|---|---|---|
| 7,545,992 B2 | 6/2009 | Kato et al. | |
| 2005/0057774 A1* | 3/2005 | Maruyama | 358/1.15 |
| 2005/0088677 A1* | 4/2005 | Hayashi | 358/1.13 |
| 2006/0007481 A1 | 1/2006 | Kato et al. | |

FOREIGN PATENT DOCUMENTS

| | | |
|---|---|---|
| CN | 1719862 A | 1/2006 |
| CN | 1825893 A | 8/2006 |
| EP | 1887795 A | 2/2008 |
| JP | 8-063345 | 3/1996 |
| JP | 10-269036 A | 10/1998 |
| JP | 11-331455 | 11/1999 |
| JP | 2000-134468 A | 5/2000 |
| JP | 2006-023942 | 1/2006 |
| JP | 2006137148 A | 6/2006 |
| JP | 2008-020946 A | 1/2008 |

OTHER PUBLICATIONS

Chinese Office Action for Application No. 200910007858.X dated Mar. 29, 2012.

Japanese Office Action dated Apr. 16, 2012 issued by the Japanese Patent Office in Japanese Application No. JP 2008-043551.

* cited by examiner

*Primary Examiner* — Thierry L Pham
(74) *Attorney, Agent, or Firm* — Carter, DeLuca, Farrell & Schmidt LLP

(57) ABSTRACT

An image processing apparatus acquires information included in application data created by an application but not in image data generated by interpreting the application data, adds the acquired information to the generated image data generated based on the application data as attribute information (meta data) of the generated image data, and outputs the generated image data and the attribute information which has been added to the generated image data to an external device.

7 Claims, 20 Drawing Sheets

F I G. 15
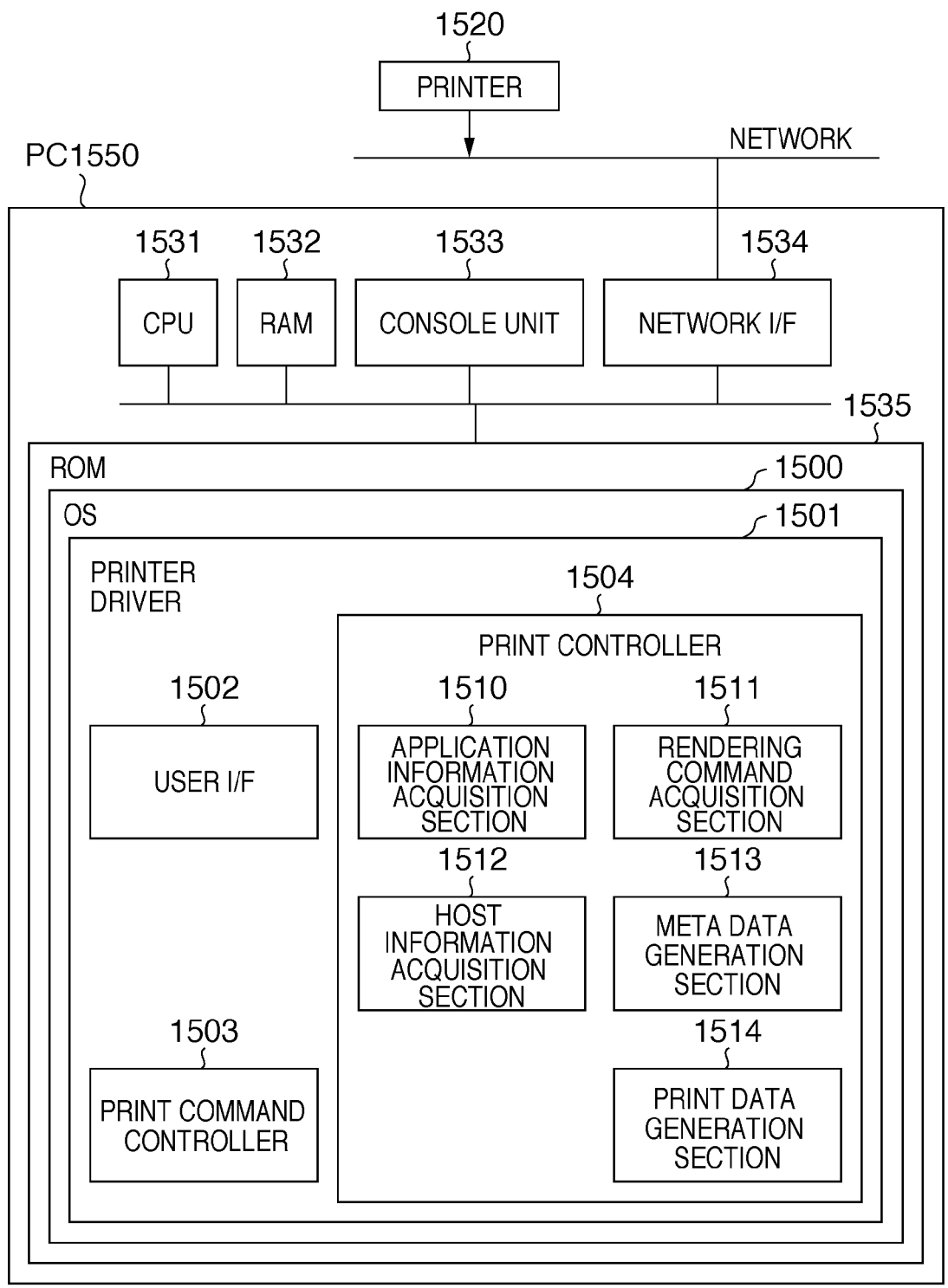

IMAGE PROCESSING APPARATUS AND CONTROL METHOD THEREOF

BACKGROUND OF THE INVENTION

1. Field of the Invention

The present invention relates to an image processing apparatus and control method, more specifically, developing application data created by an application into image data.

2. Description of the Related Art

Currently, image exchange between a plurality of imaging devices (i.e. printer, scanner, digital copier, facsimile machine) over a network in a resolution-independent data format (hereinafter, vector data) has introduced issues. When an image is exchanged with this vector data, image data such as a bitmap image is generated (rasterized) based on the vector data, so there is no image deterioration due to resolution conversion. An optimal bitmap image can thereby be generated and a high quality image obtained in each of the devices. Consequently, this is effective as a technique for coordinating devices with different capabilities. Further, in addition to this vector data, techniques have also been developed for retaining additional information that differs from the image actually printed, and either referencing this additional information when processing the image or retrieving the image based on this additional information.

If image data supplied from an image processing apparatus (host computer) is saved as a file in a secondary storage device of the output apparatus, that file can, for instance, be extracted whenever the user fancies and printed repeatedly using the output apparatus. The function for thus saving image data in file format in a secondary storage device of an output apparatus with the aim of reusing the data is called a box function, and the file system thereof is called a box. Using such a box function facilitates processing such as printing stored image data again or distributing image data to other devices with different capabilities, and also enables image data that has been generated once to be repeatedly reused (see Japanese Patent Application Laid-Open Nos. H11-331455, H8-63345, 2006-23942).

Conventionally, the above additional information was generated by performing character recognition on image data obtained by developing application data created by an application. Thus, information included in the application data created by the application but eliminated as a result of the application data being developed was not available when reusing the image data.

SUMMARY OF THE INVENTION

An aspect of the present invention is to eliminate the above-mentioned conventional problems.

A feature of the present invention is to enable the use of information included in application data created by an application but not in image data obtained by interpreting the application data.

According to an aspect of the present invention, there is provided an image processing apparatus including a generation unit configured to generate image data by interpreting application data created by an application, an acquisition unit configured to acquire information included in the application data but not in generated image data generated by the generation unit, an addition unit configured to add the information acquired by the acquisition unit to the generated image data as attribute information of the generated image data, and an output unit that outputs the generated image data and the attribute information has been added to the generated image data by the addition unit.

According to another aspect of the present invention, there is provided a control method of an image processing apparatus, including generating image data by interpreting application data created by an application, acquiring information included in the application data but not in generated image data generated in the generating step, adding the information acquired in the acquiring step to the generated image data as attribute information of the generated image data, and outputting the generated image data and the attribute information has been added to the generated image data in the adding step.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 depicts a view illustrating a functional configuration of a printer driver in a printing system in which print data is transmitted from a PC to a printer and printed according to the first embodiment.

DESCRIPTION OF THE EMBODIMENTS

Preferred embodiments of the present invention will be described hereinafter in detail, with reference to the accompanying drawings. It is to be understood that the following embodiments are not intended to limit the claims of the present invention, and that not all combinations of the aspects that are described according to the following embodiments are necessarily required with respect to the means to solve the problems according to the present invention.

Firstly, a configuration of a 1D color multifunction peripheral (MFP) connected to an image processing apparatus (described below) according to a first embodiment of the present invention will be described.

Figure 1:
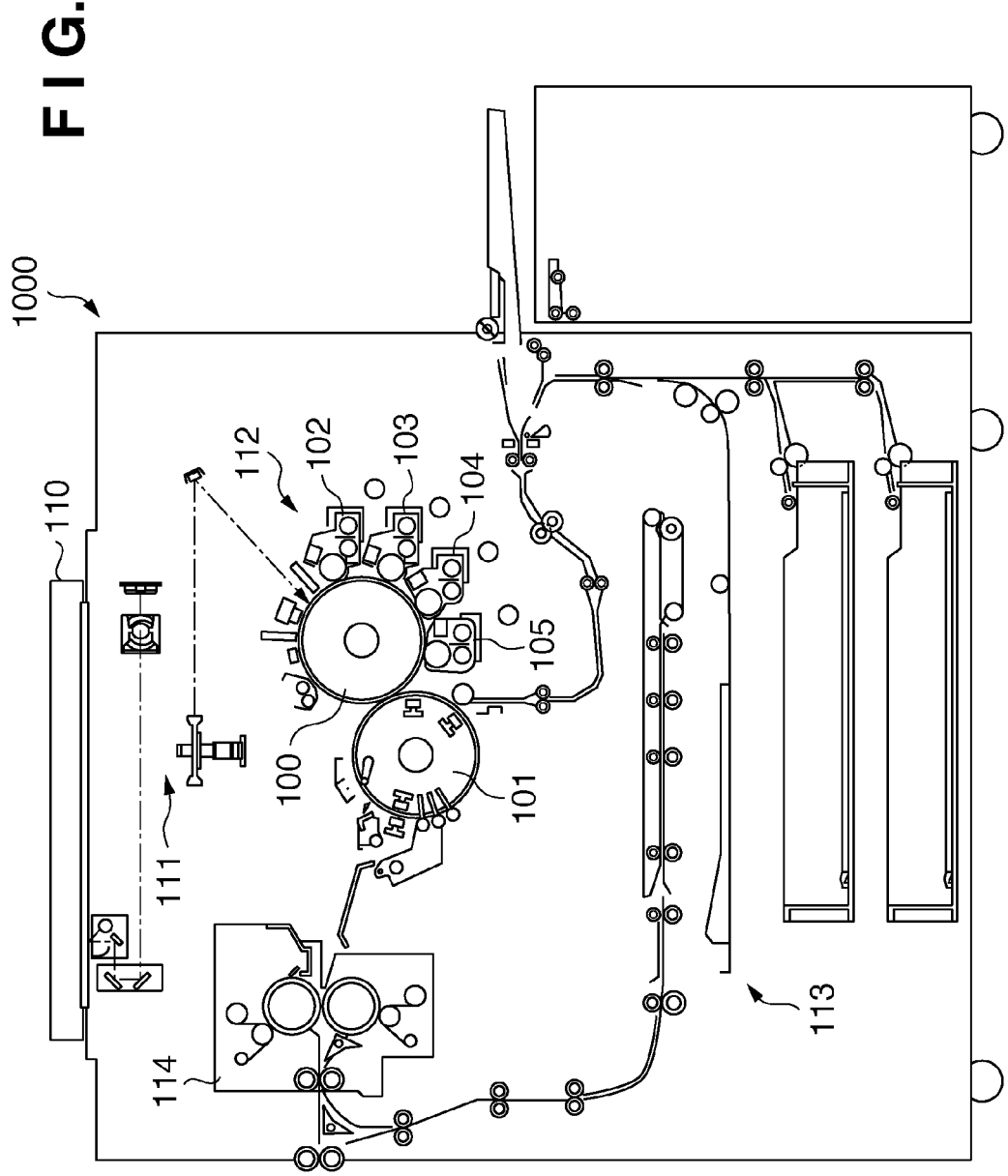
FIG. 1 depicts a view illustrating a configuration of a multifunction peripheral (MFP) according to an exemplary embodiment.

FIG. 1 depicts a view illustrating a configuration of an MFP 1000 according to an exemplary embodiment.

The MFP 1000 has a document exposure unit 110, a laser exposure unit 111, a photosensitive drum 100, an image forming unit 112, a fixing unit 114, a feed/conveyance unit 113, and a printer controller (not shown) that controls these constituent elements.

The document exposure unit 110 creates image data by radiating light onto a document placed on a platen, optically reading the reflected light and converting the image of the document to an electrical signal. The laser exposure unit 111 irradiates a light beam such as laser light modulated according to the image data onto the photosensitive drum 100 as reflected scanning light via a rotating polygonal mirror that rotates at an equiangular velocity. The image forming unit 112 rotationally drives the photosensitive drum 100, and also charges the surface of the photosensitive drum 100 using a charger and forms an electrostatic latent image that corresponds to the image data on the photosensitive drum 100 using the laser exposure unit 111. The image forming unit 112 then develops this electrostatic latent image using toner, and transfers the toner image to a recording medium (sheet) wrapped around a transfer drum 101. A series of electrophotographic processes for recovering the small amount of toner that remains on the photosensitive drum 100 without being transferred is executed at this time, and an image is formed on the sheet. Here, the aforementioned electrophotographic processes are repeatedly executed sequentially, with developing units 102 to 105 that have magenta (M), cyan (C), yellow (Y) and black (B) toner alternately supplying toner, while a sheet is wrapped around the transfer drum 101 and rotated four times. The sheet to which the four color, full-color toner image has been transferred as a result of the transfer drum 101 rotating four times is conveyed to the fixing unit 114 after separating from the transfer drum 101.

The fixing unit 114, which is constituted by a combination of rollers and a belt and incorporates a heat source such as a halogen heater, fixes the toner image by using heat and pressure to fuse the toner on the sheet to which the toner image has been transferred by the image forming unit 112.

The feed/conveyance unit 113, which has one or more sheet repositories typified by sheet cassettes or paper decks, separates one sheet from the plurality of sheets housed in a sheet repository and conveys the sheet to the image forming unit 112 according to an instruction from the printer controller. The sheet is wrapped around the transfer drum 101 of the image forming unit 112 and rotated four times, before being conveyed to the fixing unit 114. At this time, the aforementioned YMCK color toner image is transferred to the sheet during the four rotations, as noted above. In the case of image forming on both sides of the sheet, control is performed so that the sheet that has passed through the fixing unit 114 again passes along the conveyance path to the image forming unit 112.

The printer controller, in communication with a controller 200 (FIG. 2) that performs overall control of the MFP 1000, executes control according to instructions from the controller 200, and also issues instructions so that harmony is maintained and everything runs smoothly while managing the state of the various aforementioned constituent elements that perform scanning, laser exposure, image forming, fixing and feeding/conveying.

Figure 2:
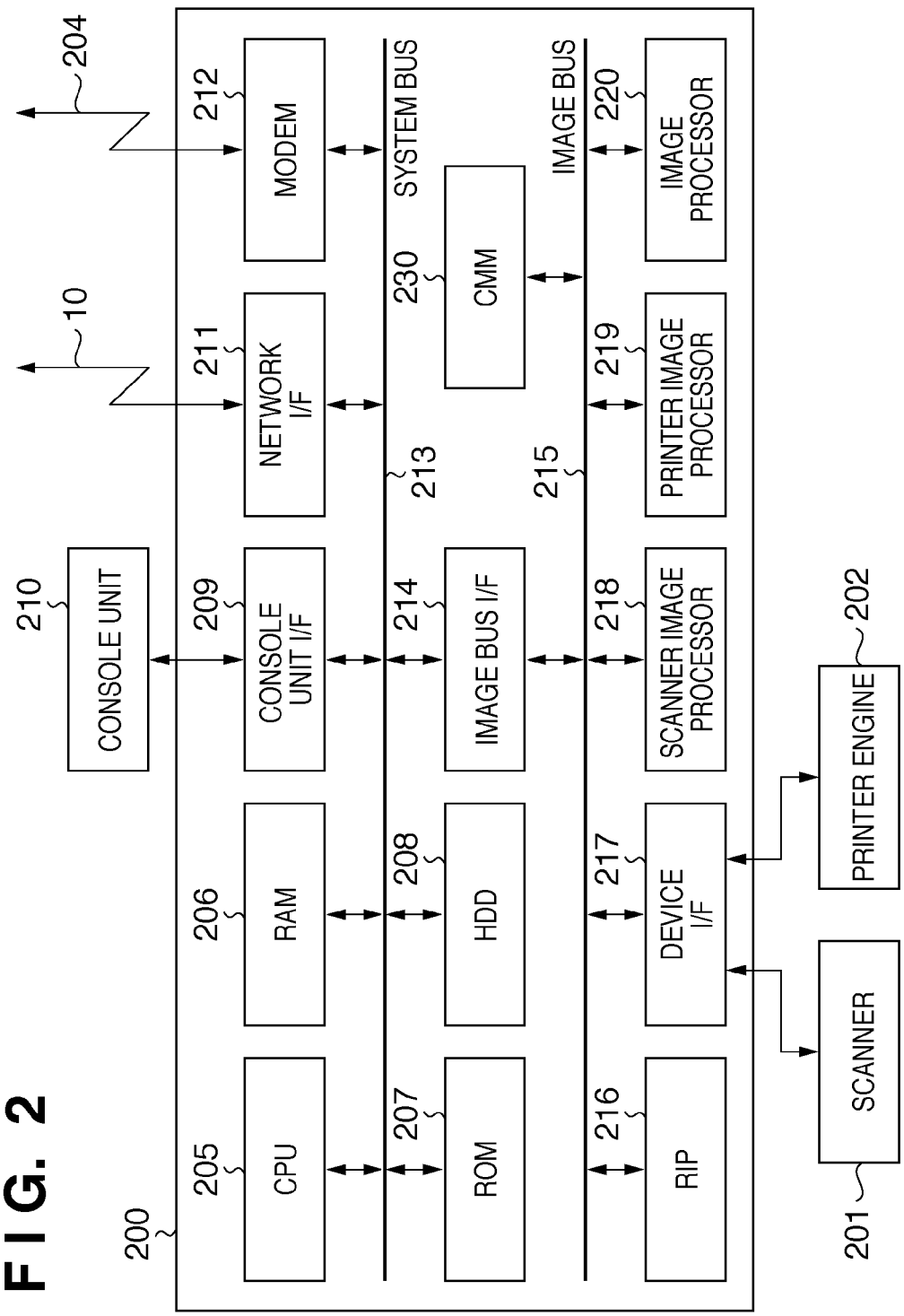
FIG. 2 is a block diagram illustrating an exemplary configuration of a controller of the MFP according to the exemplary embodiment.

FIG. 2 is a block diagram illustrating an exemplary configuration of the controller 200 of the MFP 1000.

The controller 200 is connected to a scanner 201 that serves as an image input device and a printer engine 202 that serves as an image output device, and controls reading, printing and the like of document images. Note that the scanner 201 equates to the aforementioned document exposure unit 110, and that the printer engine 202 includes the laser exposure unit 111, the photosensitive drum 100, the image forming unit 112, the fixing unit 114 and the feed/conveyance unit 113 shown in FIG. 1. The controller 200, by connecting to a LAN 10 and a public line 204, performs control for inputting and outputting image data and device information via the LAN 10 or the public line 204.

A CPU 205 is a central processing unit for performing overall control of the MFP 1000. A RAM 206 provides a work memory for temporarily storing various data when the CPU 205 executes processing, and is also a memory for temporarily storing input image data. A ROM 207 is a boot ROM in which boot programs are stored. An HDD 208 is a hard disk drive which stores system software for various processing, input image data, and the like. A console unit interface 209 is an interface unit that controls an interface with a console unit 210 that has a display unit capable of displaying image data and the like, and outputs display data to the console unit 210. The console unit interface 209 acts to convey information input by an operator using keys or the like of the console unit 210 to the CPU 205. A network interface 211 is realized by a LAN card, for example, and inputs/outputs information via the LAN 10. A modem 212 is connected to the public line 204, and inputs/outputs information with an external device connected to the public line 204. The above constituent elements are disposed on a system bus 213.

An image bus interface 214 is bus interface for connecting the system bus 213 and an image bus 215 that performs fast image data transfer, as well as a bus bridge that converts data structures. Connected to the image bus 215 are a raster image processor (RIP) 216, a device interface 217, a scanner image processor 218, a printer image processor 219, an image processor 220, and a color management module (CMM) 230. The RIP 216 develops page description language (PDL) code and vector data (described below) into image data. The device interface 217 connects the scanner 201 and the printer engine 202 with the controller 200, and performs synchronous and asynchronous conversion of image data. The scanner image processor 218 performs various processes such as correction, modification and editing on image data input from the scanner 201. The printer image processor 219 performs processes such as correction and resolution conversion according to the printer engine 202 on image data to be printed. The image processor 220 performs image processing such as rotation and compression/decompression of image data. The CMM 230 is a dedicated hardware module that performs color conversion (also called color space conversion) on image data based on profiles and calibration data. A profile is information such as a function for converting color image data expressed by a device-dependent color space to a device-independent color space (e.g., La*b*). Calibration data is data for correcting the color reproduction characteristics of the scanner 201 and the printer engine 202 in a color MFP.

Figure 3:
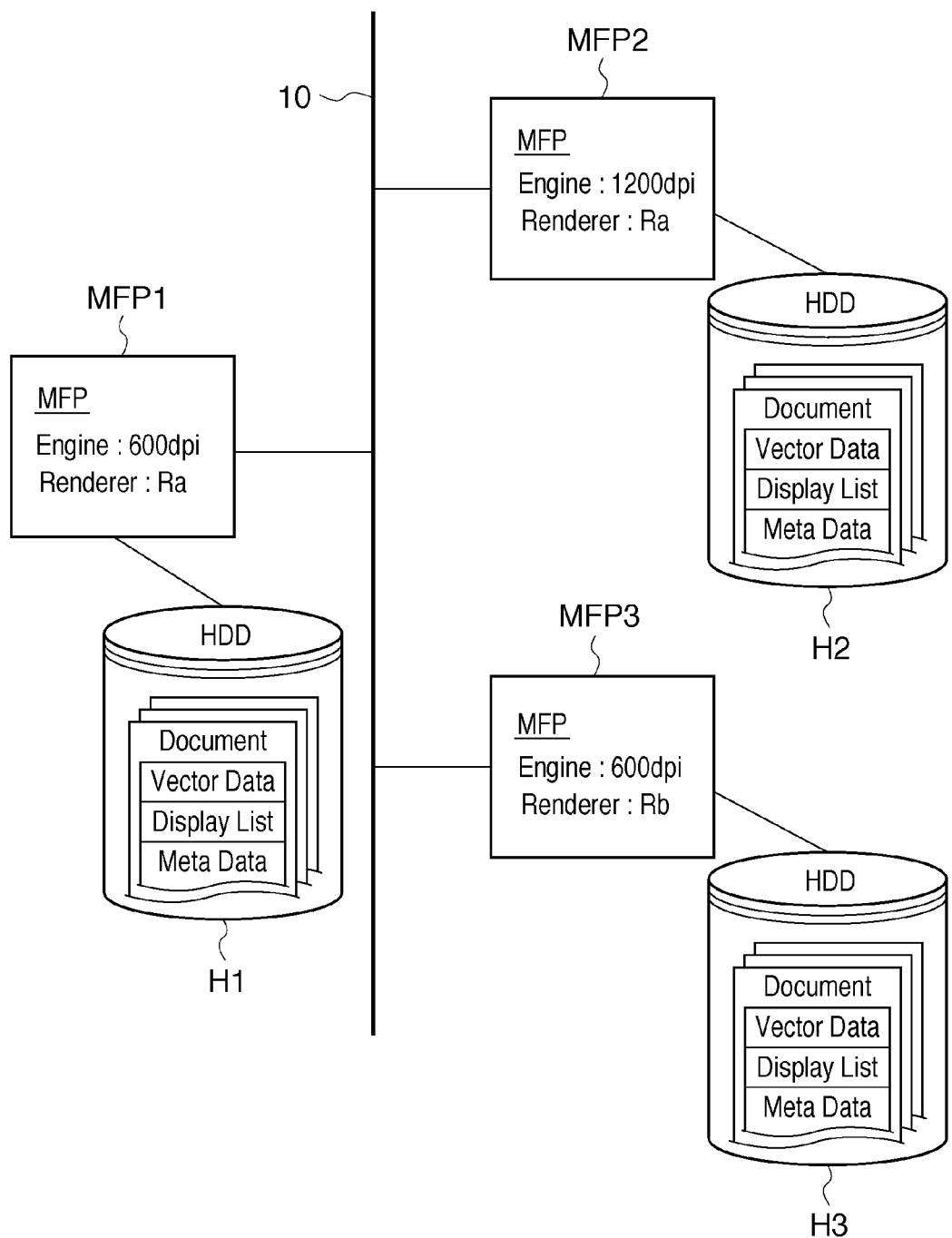
FIG. 3 is a block diagram showing the overall configuration of an image processing system according to the exemplary embodiment.

FIG. 3 is a block diagram showing the overall configuration of an image processing system composed of a plurality of MFPs provided with similar functions to the MFP 1000.

In FIG. 3, this image processing system is equipped with an MFP 1, an MFP 2 and an MFP 3 connected to one another via the LAN 10. Here, the MFPs are configured such as shown in the aforementioned FIGS. 1 and 2. HDDs H1, H2 and H3 (secondary storage devices) are equivalent to the HDD 208 shown in FIG. 2. Here, the print resolution of the printer engine 202 mounted in each MFP differs, with the MFP 1 and the MFP 3 both being 600 dpi, while the MFP 2 is 1200 dpi. The type of RIP 216 mounted in each MFP also differs, with the RIPs 216 of the MFP 1 and the MFP 2 being the same ("Ra" in FIG. 3), while only the MFP 3 differs ("Rb"). Since the RIP 216 is generally constituted by hardware such as an application specific integrated circuit (ASIC), different types of renders are unable to process a group of different types of graphics commands. This group of rendering commands is generally called a DisplayList (hereinafter, DL). A DL, which consists of instructions processable with hardware, is generated with software from vector data having complex rendering description, and is resolution-dependent.

Here, the MFPs 1, 2 and 3 are able to communicate with one another using a network protocol. Note that these MFPs connected to the LAN 10 are not limited to being physically disposed as described above. Devices other than MFPs (e.g., PCs, various servers, printers, etc.) may also be connected to the LAN 10.

Figure 4:
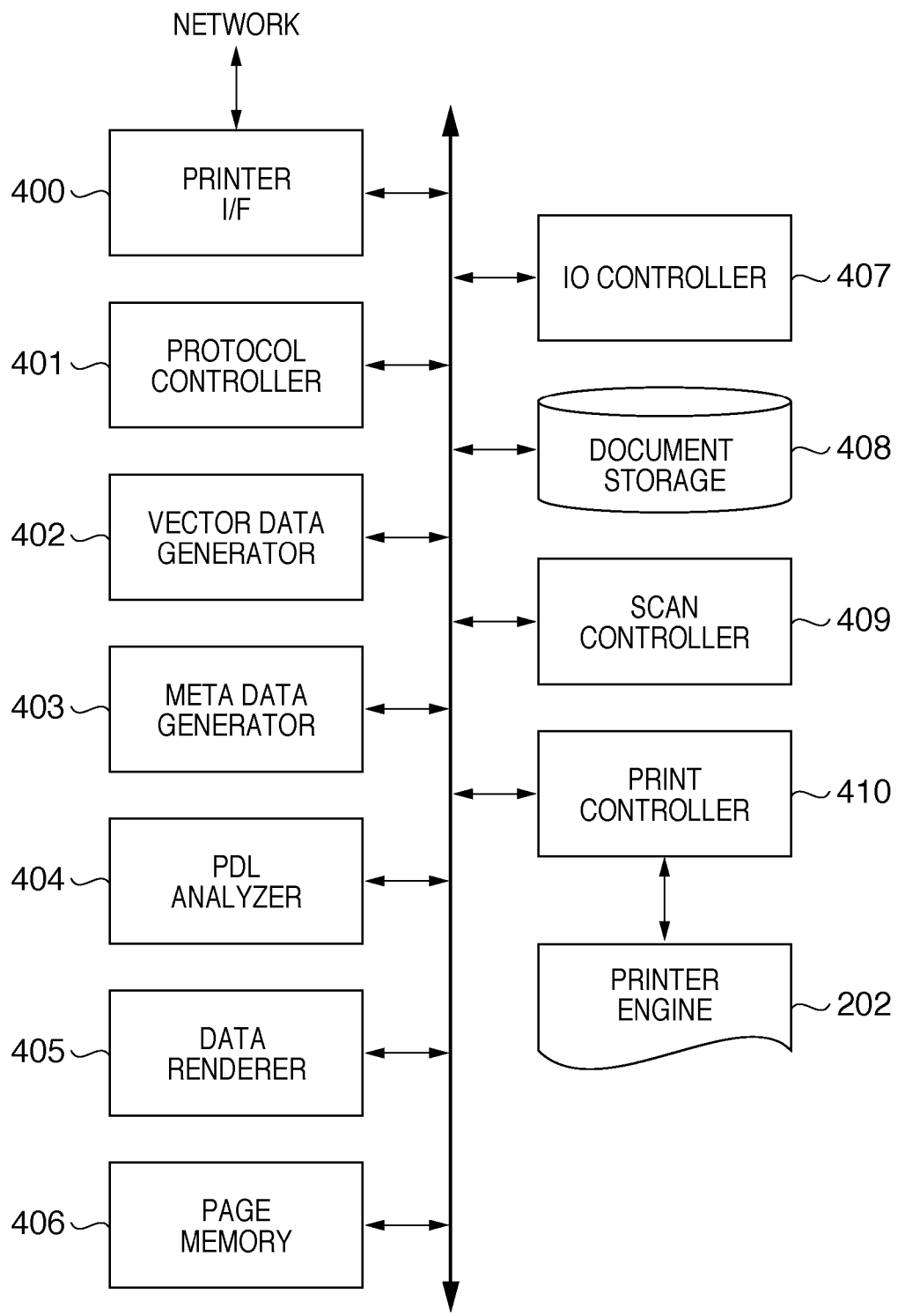
FIG. 4 is a functional block diagram showing a software configuration of the controller that controls the operations of the MFP according to a first embodiment of the present invention.

FIG. 4 is a functional block diagram showing a software configuration of the controller 200 that controls the operations of the MFP 1000.

A printer interface 400 controls data transmission/reception with an external device (host computer, etc.) via the LAN 10. A protocol controller 401 communicates with an external device by analyzing and transmitting a network protocol. A vector data generator 402 generates (vectorizes) vector data constituting resolution-independent rendering description from bitmap data. A meta data generator 403 generates secondary information obtained in the vectorization process as meta data. Here, meta data denotes additional data used for data retrieval but not required for rendering an image. A PDL analyzer 404 analyzes PDL data and converts the PDL data to intermediate codes (DisplayList) of a more readily processable format. The intermediate codes generated by the PDL analyzer 404 are passed to a data renderer 405 and processed. The data renderer 405 develops the intermediate codes into bitmap data. The bitmap data thus developed is sequentially rendered in a page memory 406 proved in the RAM 206. An input/output (IO) controller 407 controls data exchange with the console unit 210. A document storage 408 stores data files containing vector data, DLs, meta data and the like in units of input documents (jobs). The document storage 408 is realized by a secondary storage device such as the HDD 208. Note that these data files are called documents in the present embodiment. A scan controller 409 performs various processes such as correction, modification and editing on image data input from the scanner 201. A print controller 410 converts the content of the page memory 406 to a video signal and transfers the video signal to the printer engine 202.

Next, the generation of the vector data, DL and meta data constituting a document will be described.

Figure 5:
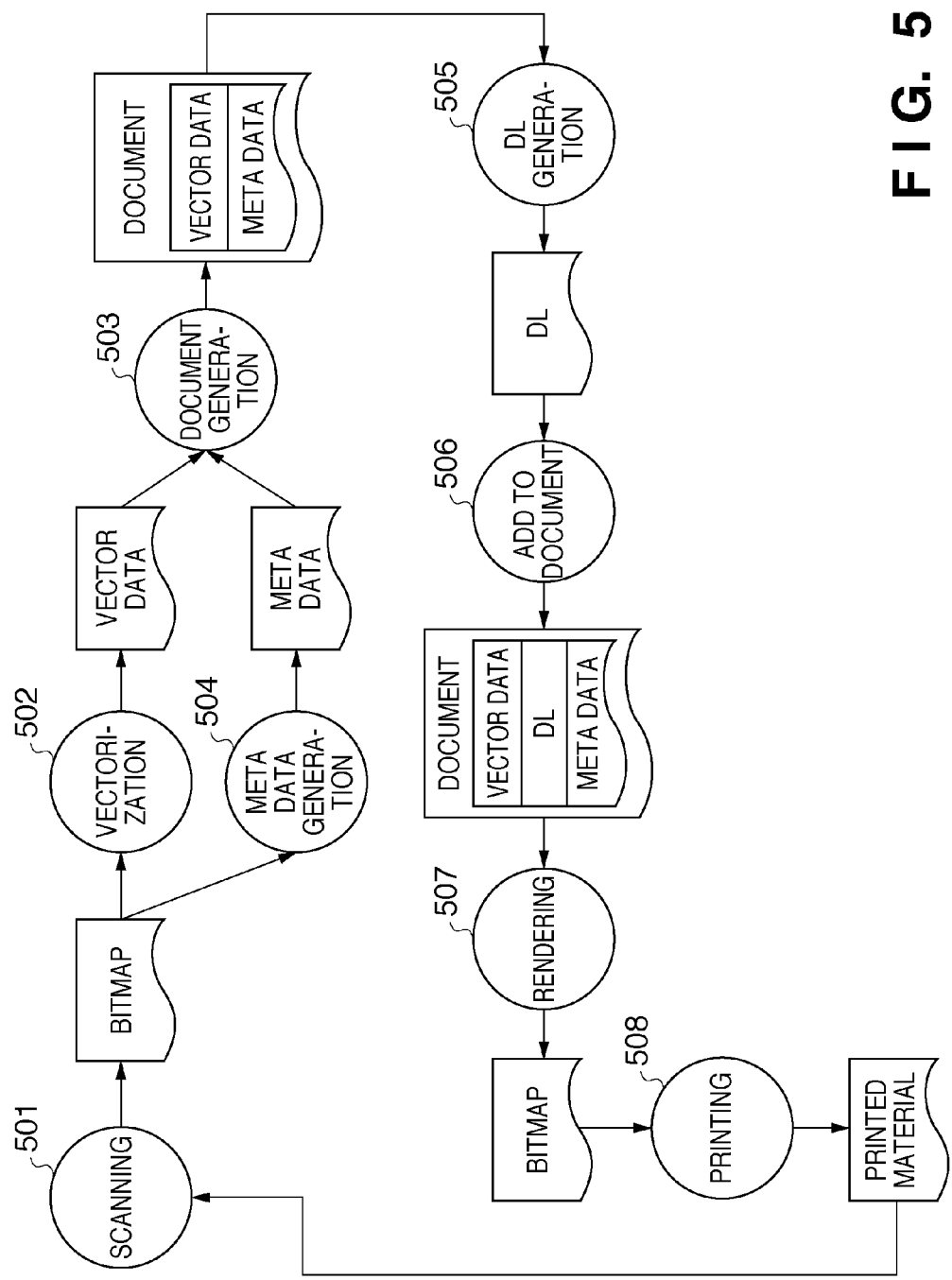
FIG. 5 depicts a view illustrating a data flow when the MFP executes a copy operation according to the first embodiment.
Figure 6:
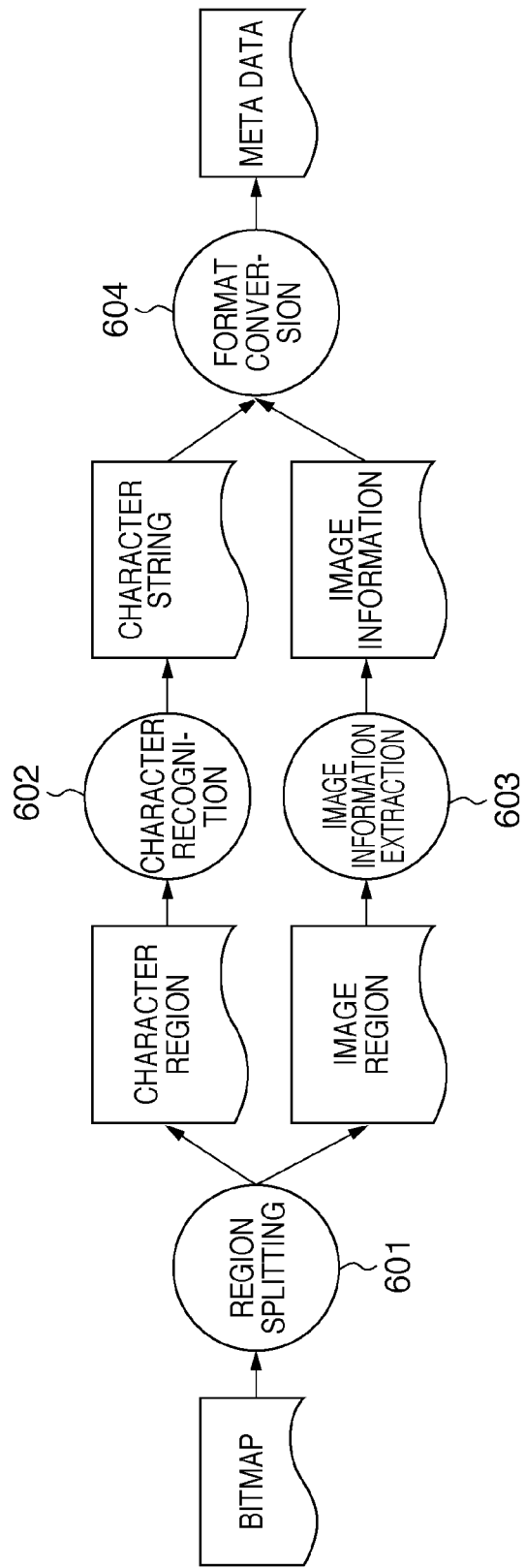
FIG. 6 shows a specific processing flow of a meta data generation process shown in FIG. 5.
Figure 7:
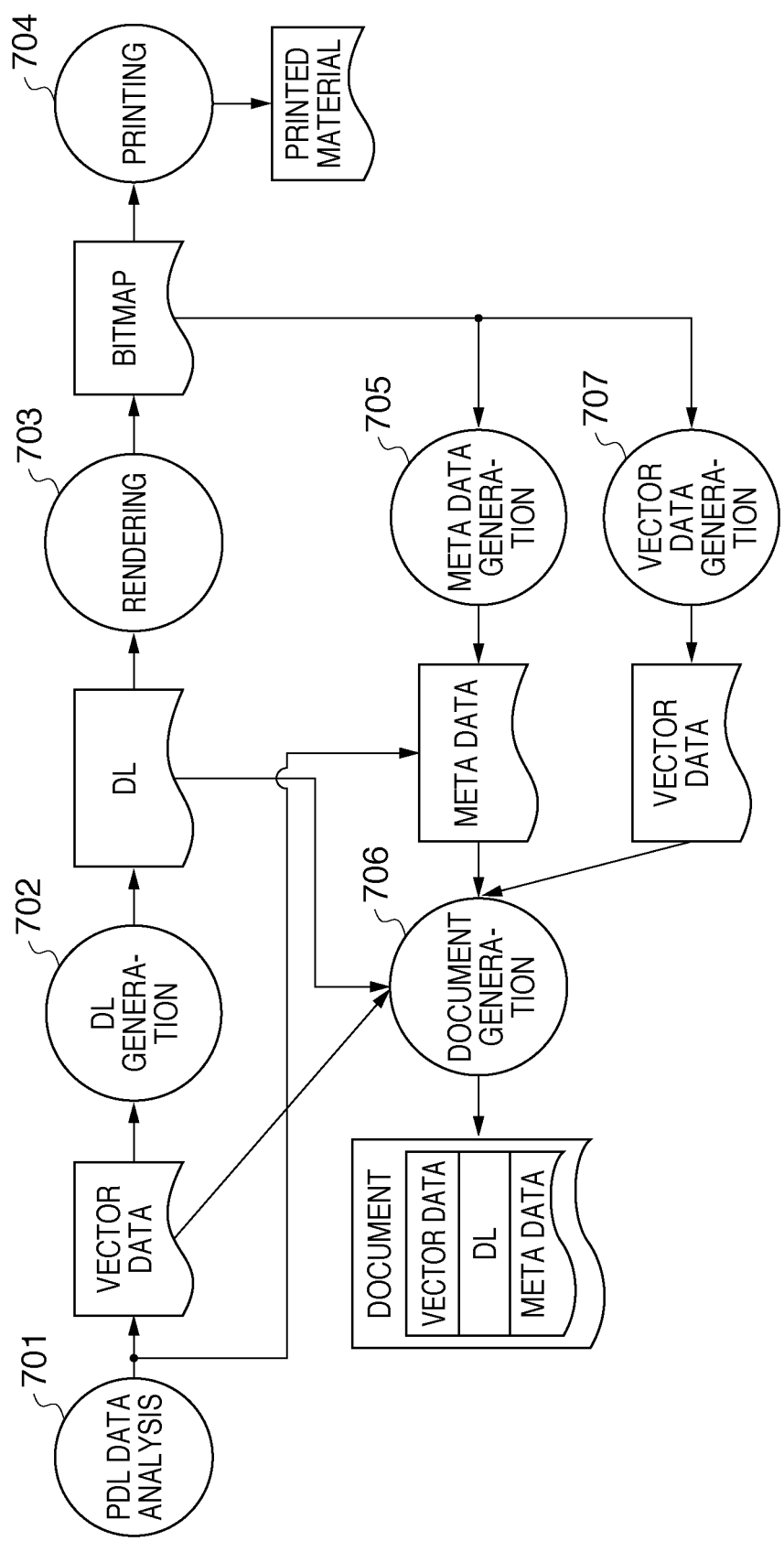
FIG. 7 shows the data processing flow when printing PDL data.

FIGS. 5 to 7 illustrate the flow of data processing by the controller 200 of the MFP 1000.

FIG. 5 depicts a view illustrating a data flow when the MFP 1000 executes a copy operation.

Firstly, a document set in the document exposure unit 110 is converted to bitmap data by a scanning process 501. Next, resolution-independent vector data and meta data that will accompany the vector data are respectively generated from the bitmap data by a vectorization process 502 and a meta data generation process 504. Specific methods of generating these vector data and meta data will be described later.

Next, a document with which the vector data and the meta data are associated is generated by a document generation process 503. Next, a DL is generated from the vector data in the document by a DL generation process 505, and the generated DL is stored in the document at 506. This document is then sent to a rendering process 507 and developed into bitmap data. The bitmap data thus developed is printed onto a sheet that serves as a recording medium by a printing process 508. Note that the processing from the scanning process 501 onwards can be performed after again setting the printed material thus printed in the document exposure unit 110.

FIG. 6 shows a specific processing flow of the meta data generation process 504 shown in FIG. 5.

Firstly, region splitting is performed on the bitmap data by a region splitting process 601. This region splitting process 601 involves analyzing input bitmap image data, splitting the bitmap image data into regions for each grouping of objects included in the image represented by the bitmap, and determining and classifying the attributes of the various regions. Here, attributes include TEXT, PHOTO, LINE, PICTURE and TABLE, as shown in FIG. 8, for example.

Figure 8:
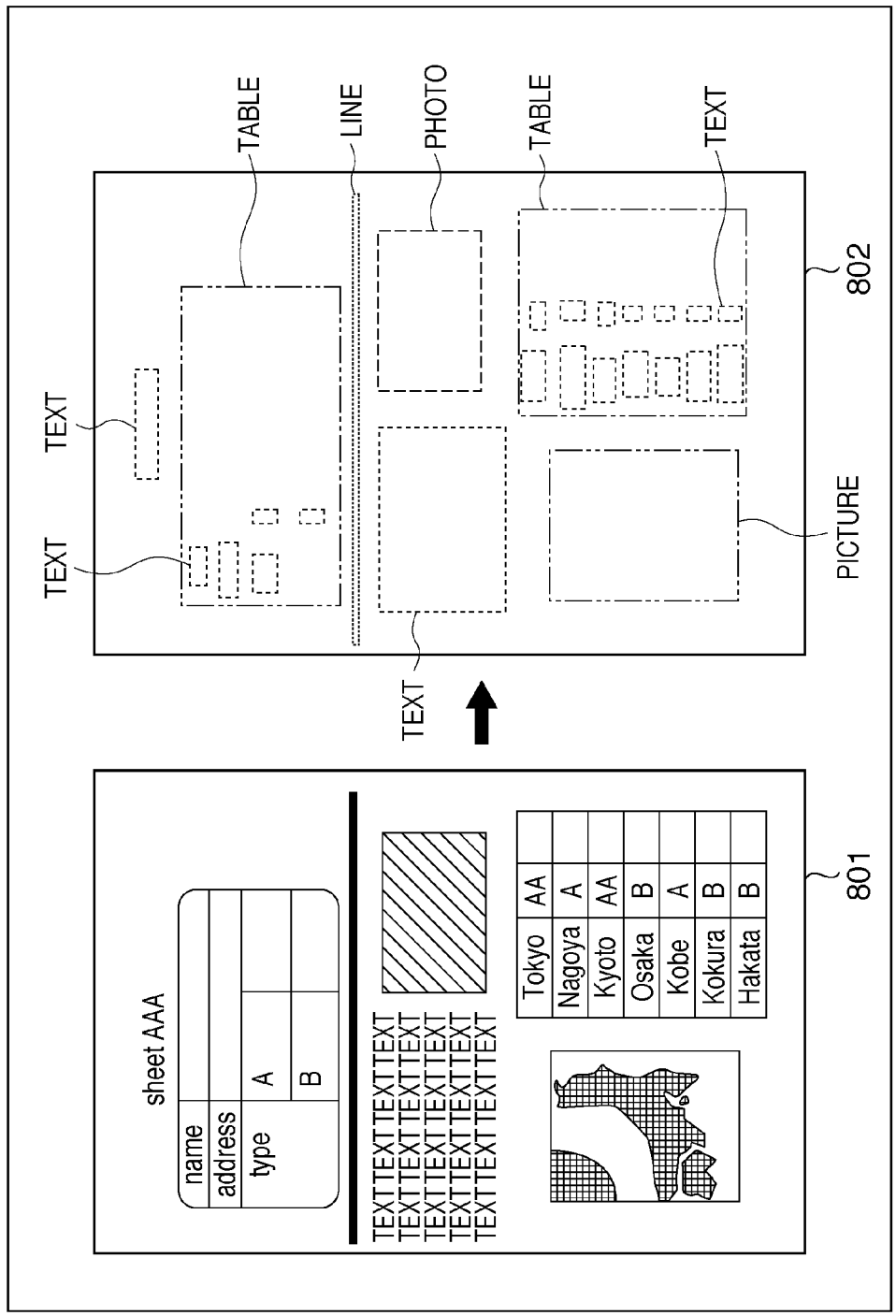
FIG. 8 depicts a view illustrating an exemplary case where region splitting has been performed on an input image.

FIG. 8 depicts a view illustrating an exemplary case where region splitting has been performed on an input image.

The result of performing region splitting on an input image 801 is shown by the determination result 802. In the determination result 802, each portion enclosed with a broken line represents a single object unit that results from analyzing the image, and the type of attribute attached to each object shows the determination result of the region splitting.

Character recognition is performed on any character regions having the TEXT attribute out of the regions thus classified into attributes by a character recognition process 602 (FIG. 6), and the character strings of these regions are converted to character codes.

On the other hand, any image regions having the PHOTO attribute are converted to image information by an image information extraction process 603. This image information includes a character string expressing the features of the image, and is represented by a character string describing the image, like "flower" or "face", for example. Extraction of this image information can be realized using a general image processing technique such as image feature (e.g., frequency or density of pixels constituting the image) detection or face recognition. Character strings thus generated as a result of the character recognition and image information consisting of character strings describing the images are arranged in a data format (described below) by a format conversion process 604 (FIG. 6) to generate meta data.

FIG. 7 shows the data processing flow when printing PDL data. Here, PDL printing is a printer processing operation in which page description language (PDL) data generated by a printer driver on a PC (host computer (not shown)) is received and printed in the case where printing is instructed by the application on the PC.

The PDL data received from the PC is analyzed by a PDL data analysis process 701 and vector data is generated. Next, a DL is generated from the vector data by a DL generation process 702, and the generated DL is stored in a document by a document generation process 706. At the same time, the vector data is sent to a rendering process 703 and developed into bitmap data. The bitmap data thus developed is printed on a sheet by a printing process 704 to form printed material. The vector data and DL generated with this procedure are stored as a document by the document generation process 706.

Character strings and image information are generated as meta data by a meta data generation process 705 from the bitmap data generated by the rendering process 703 and stored in the document by the document generation process 706, similarly to the copy operation shown in FIG. 5. Further, vector data may also be generated from the bitmap data after rendering, as shown by a vector data generation process 707, in order to eliminate PDL dependency.

Note that here the MFP 1000 does not retain character font information. Thus, in the case where character information is included in application data created by an application on a PC, the character information is transmitted to the MFP 1000 as PDL data after having been developed into image data by a printer driver (described below).

Next, the processes of generating and printing a document will be described.

Figure 9:
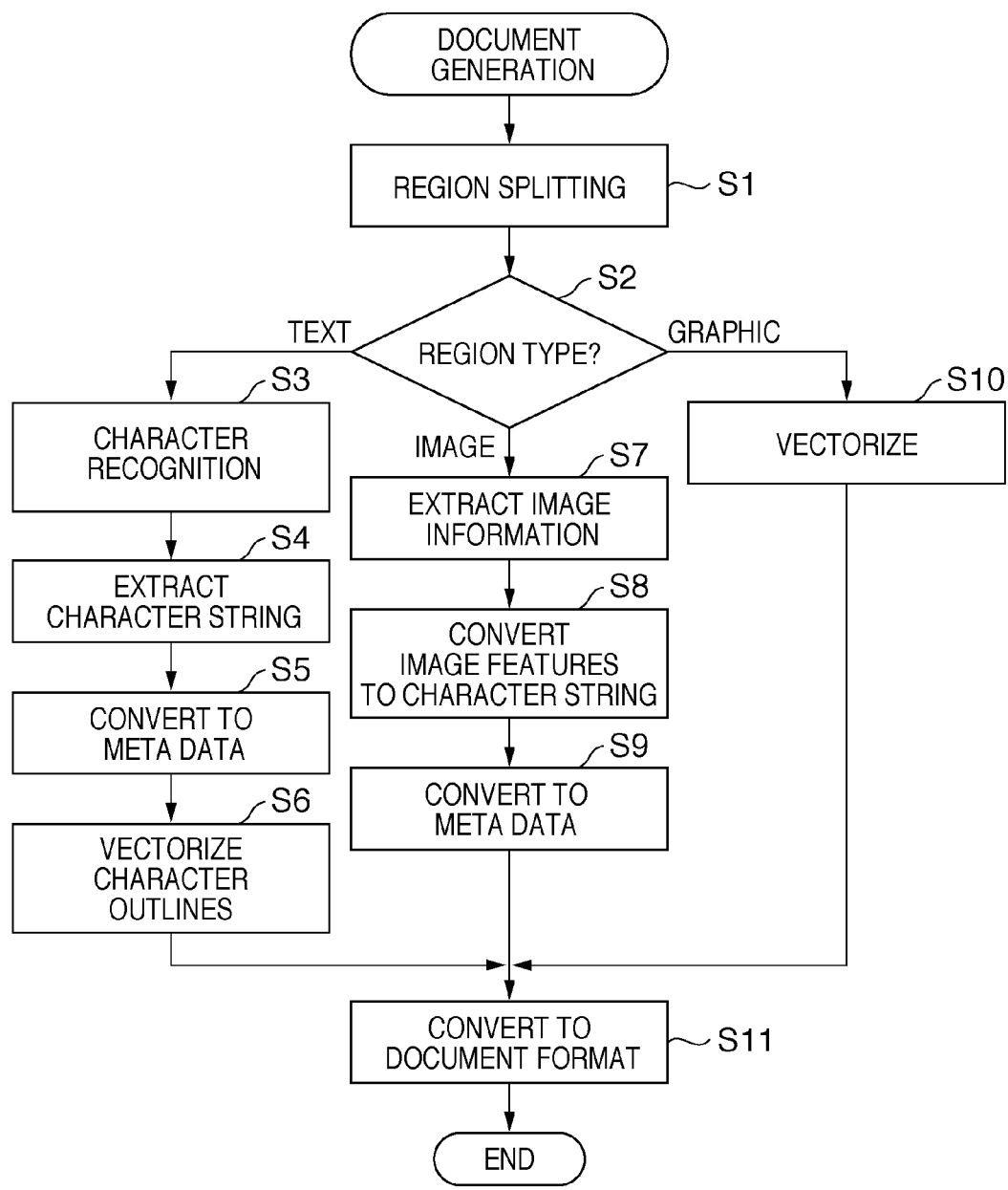
FIG. 9 is a flowchart explaining a document generation process by the controller according to the first embodiment.

FIG. 9 is a flowchart showing the document generation process by the controller 200 of the MFP. This process involves receiving bitmap data and generating a document constituted by vector data, a DL and meta data. This process is executed under the control of the CPU 205 in accordance with a program loaded in the RAM 206 from the HDD 208.

Firstly, in step S1, the aforementioned region splitting is performed. Next, the processing proceeds to step S2, where the type (attribute) of each of split regions is determined. Here, as aforementioned, the regions are classified into the attributes TEXT, IMAGE and GRAPHIC, with different processing being performed on each attribute. Note that while the regions are classified into the attributes TEXT, PHOTO, LINE, PICTURE and TABLE in the example shown in FIG. 8, in FIG. 9 PHOTO and PICTURE regions are classified as IMAGE, and LINE and TABLE regions are classified as GRAPHIC. Note also that character regions are classified as TEXT, similarly to FIG. 8.

If the attribute is TEXT, the processing proceeds from step S2 to step S3, where character recognition is performed on the character image, after which the processing proceeds to step S4, where a character string resulting from the character recognition is acquired. Subsequently, the processing proceeds to step S5, where the character string acquired in step S4 is converted to meta data. Next, the processing proceeds to step S6, where the outlines of the recognized characters are converted to vector data. Then, in step S11, the vector data is converted to document format and included in a document.

Here, the processing of step S5 will be described in more detail.

Meta data generated from a character string is a list of character codes, which is information required for keyword searches. However, the character recognition process is, for example, unable to recognize the style (e.g., mincho, gothic), character size (e.g., 10 pt, 12 pt) or character embellishments (e.g., italic, bold) of a character image, despite being able to convert from a character image to character codes. Consequently, in step S5, a character pattern is rendered from the recognized character codes in accordance with the style and size of characters in the character image. In step S6, the character outlines are extracted from the character pattern and retained as vector data. Information including the character embellishments of character strings is created as meta data and included in the document.

On the other hand, if, in step S2, it is determined that the attribute of the region is IMAGE, the processing proceeds to step S7, where image information is extracted. In step S7, the features of the image are detected using a general image processing technique such as image feature detection or face recognition, as aforementioned. Next, the processing proceeds to step S8, where the features of the image detected in step S7 are converted to a character string for indicating the features. This conversion can readily be implemented by using a table that stores feature parameters and corresponding character strings. Subsequently, the processing proceeds to step S9, where the character string is converted to meta data. The processing then proceeds to step S11, where the meta data is converted to document format and included in the document. Here, a region having the IMAGE attribute retains the image data as bitmap data without performing vectorization.

If, in step S2, it is determined that the attribute of the region is GRAPHIC, the processing proceeds to step S10, and vectorization is performed. The processing then proceeds to step S11, where the vector data is converted to document format and included in the document.

Figure 10:
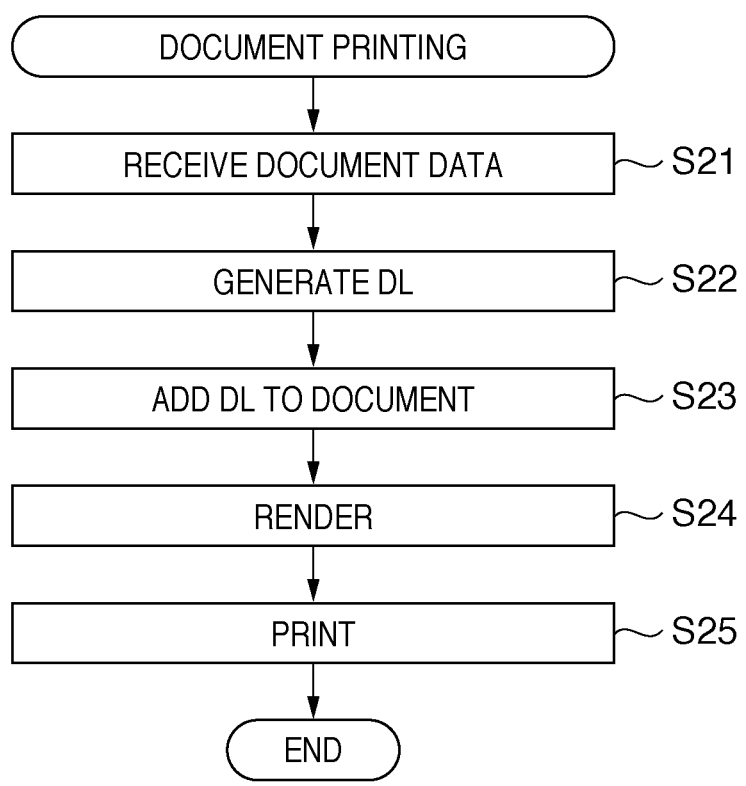
FIG. 10 is a flowchart explaining a document printing process by the controller according to the first embodiment.

FIG. 10 shows the document printing process. This process involves printing out a generated document.

FIG. 10 is a flowchart showing the document printing process by the controller 200 of an MFP according to the first embodiment of the present invention. This process is executed under the control of the CPU 205 in accordance with a program loaded in the RAM 206 from the HDD 208.

Firstly, in step S21, a document is received. Next, the processing proceeds to step S22, where a DL is generated from the vector data of the document. Next, the processing proceeds to step S23, where the DL generated in step S22 is added to the document. Next, the processing proceeds to step S24, where the DL is rendered into bitmap data. Finally, the processing proceeds to step S25, where printing to a sheet is performed based on the bitmap data.

Figure 11:
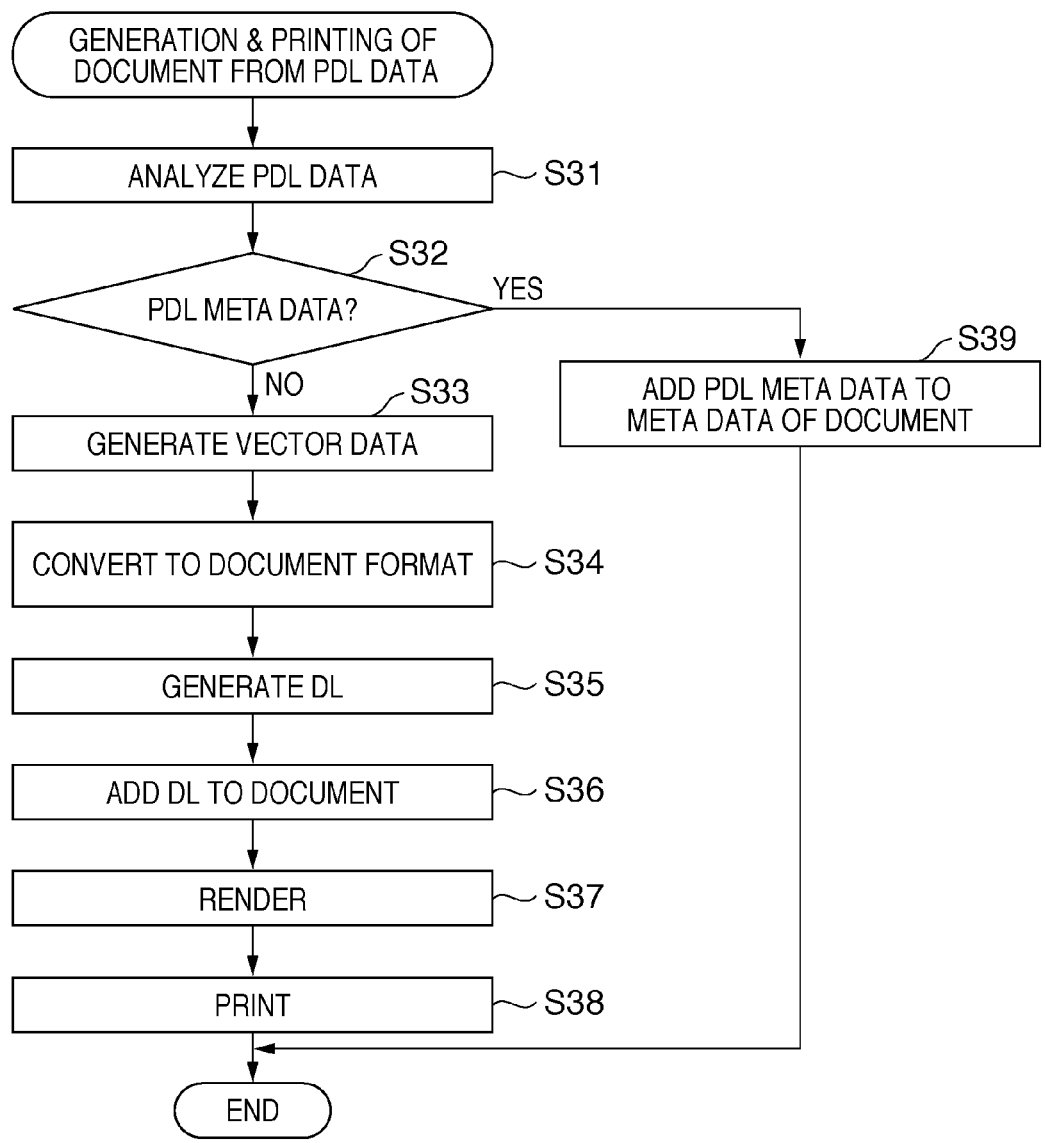
FIG. 11 is a flowchart explaining a process of generating and printing a document from PDL data by the controller according to the first embodiment.

FIG. 11 is a flowchart showing a process of generating and printing a document from PDL data by the controller 200 of an MFP according to the first embodiment. This process is executed under the control of the CPU 205 in accordance with a program loaded in the RAM 206 from the HDD 208.

Firstly, in step S31, the PDL data is analyzed. In step S32, it is determined during this analysis whether meta data (additional data) such as character string information is included. If the meta data is included, the processing proceeds to step S39, where the meta data of the PDL data is added to the document. This is equivalent to the case where, in FIG. 7, the processing proceeds from the PDL data analysis 701 to the document generation 706 via the meta data.

On the other hand, in the case of data other than meta data such as character string information being included, the processing proceeds to step S33, where the data is converted to vector data. The processing then proceeds to step S34, where a document is generated. Next, the processing proceeds to step S35, where a DL is generated (equivalent to the DL generation process 702 in FIG. 7). Next, the processing proceeds to step S36, where the DL generated in step S35 is added to a document (proceeding from DL to the document generation process 706 in FIG. 7). A document is generated by the processing flow up to this point. The processing is completed by the rendering process of step S37 (rendering process 703 in FIG. 7) and the process of printing onto a sheet of step S38 (printing process 704 in FIG. 7).

Next, the data structure of a document will be described.

FIGS. 12, 13, 14A and 14B show the structure of a document.

Figure 12:
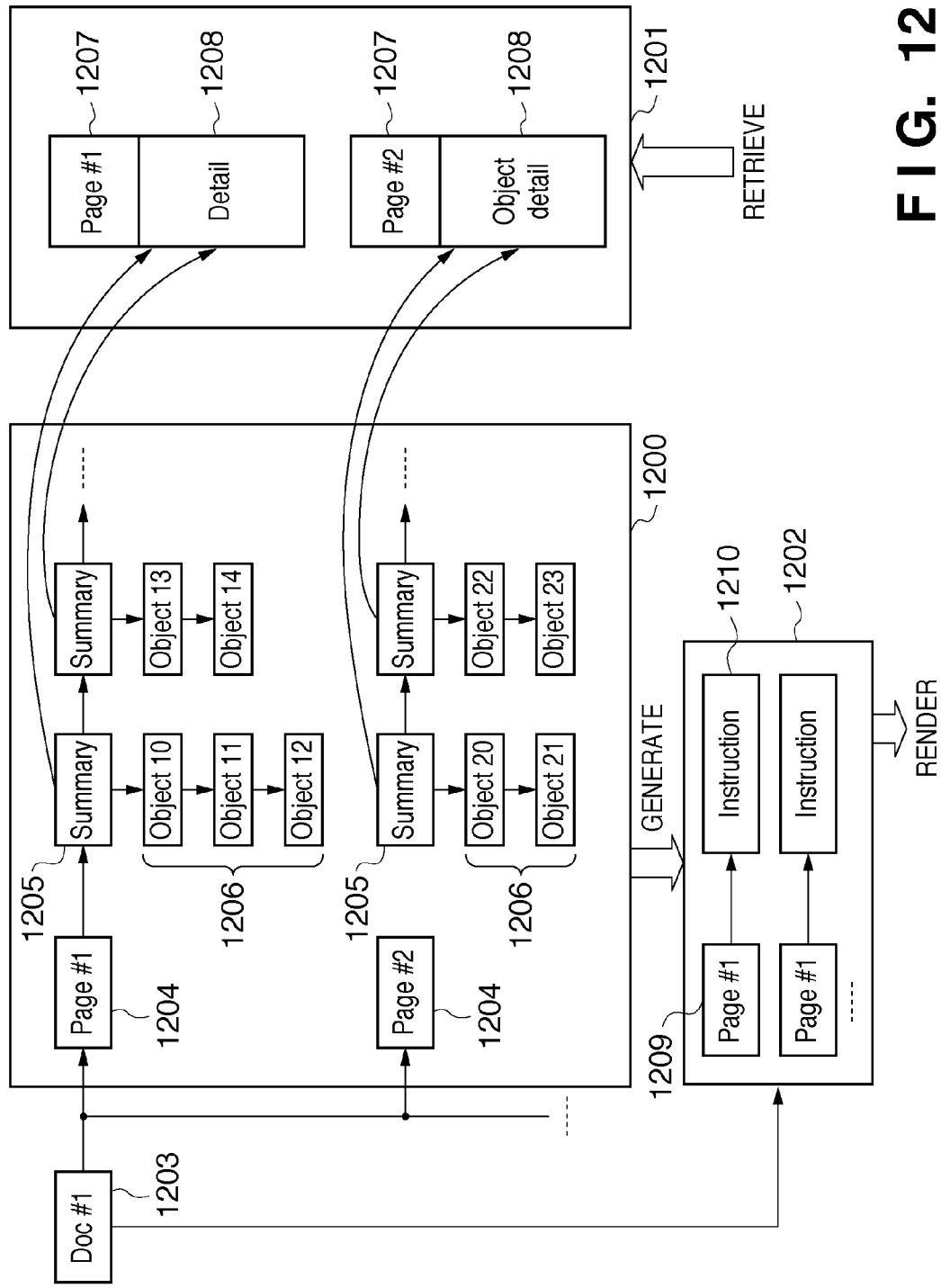
FIG. 12 depicts a view illustrating the data structure of a document according to the first embodiment.

FIG. 12 depicts a view illustrating the data structure of a document according to the first embodiment.

A document is data composed of a plurality of pages, and has a hierarchical structure that is constituted broadly by vector data 1200, meta data 1201 and a DL 1202, and headed by a document header 1203. The vector data 1200 further includes page headers 1204, summary information 1205, and objects 1206. The meta data 1201 includes page information 1207 and detail information 1208. The DL 1202 has page headers 1209 and instructions 1210 for use in rendering/developing data. The storage location of the vector data 1200 and the storage location of the DL 1202 are described in the document header 1203. The vector data 1200 and the DL 1202 are thereby associated by the document header 1203.

The vector data 1200 is resolution-independent rendering data. The page headers 1204 describe layout information such as the size and orientation of the pages. Rendering data such as lines, polygons, and Bezier Curves are each linked to an object 1206, and a plurality of objects are collectively associated by the summary information 1205. The summary information 1205 collectively expresses the features of a plurality of objects, with the attribute information of the regions illustrated in FIG. 8 being described in this summary information.

The meta data 1201 is additional information for use in data retrieval and is not directly related to the process of rendering an image. The page information 1207 describes page information indicating, for example, whether the vector data 1200 has been generated from bitmap data or from PDL data. The detail information 1208 describes OCR information or a character string (character code string) that constitutes image information showing the features of the image.

The summary information 1205 of the vector data 1200 references meta data related to a given page, enabling the detail information 1208 corresponding to that page to be located from this summary information 1205.

The DL 1202 consists of intermediate codes for the renderer (RIP 216) to develop into bitmap data. Each page header 1209 contains a management table for managing rendering information (instructions) in that page. The instructions 1210 are constituted by resolution-dependent rendering information.

Figure 13:
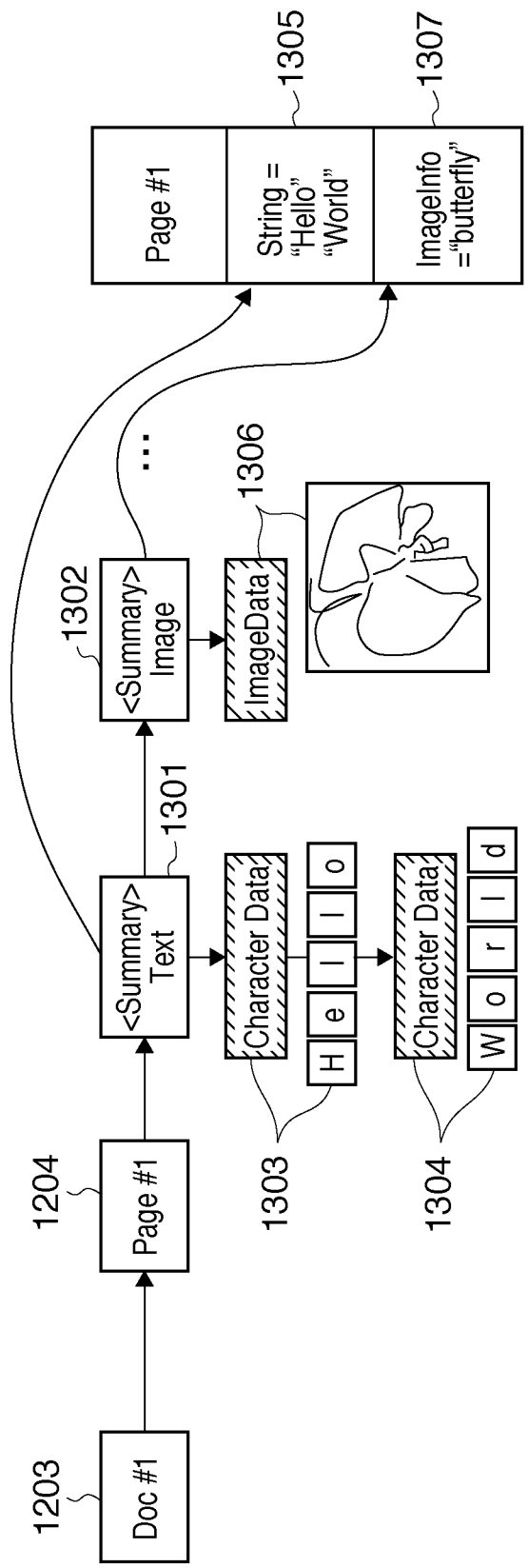
FIG. 13 depicts a view illustrating a specific example of document data.

FIG. 13 depicts a view illustrating a specific example of the document data shown in FIG. 12.

In FIG. 13, TEXT and IMAGE are respectively retained in the summary information 1301 and 1302 of the first page. The character outlines "H e l l o" (object 1303) and "W o r l d" (object 1304) are linked to the TEXT summary information 1301 as vector data. Further, the character code string "Hello" "World" (meta data) 1305 is referenced from the summary information 1301. The photographic image (JPEG) 1306 of a butterfly is linked to the IMAGE summary information 1302. The image information "butterfly" (meta data) 1307 is referenced from the summary information 1302. Consequently, searching for text on a page with the keyword "World", for example, is performed with the following procedure.

Firstly, the page data of vector data is sequentially acquired from the document header 1203, and meta data 1305 linked to the TEXT attribute is retrieved from the summary information 1301 linked to the page header 1204.

Figure 14A:
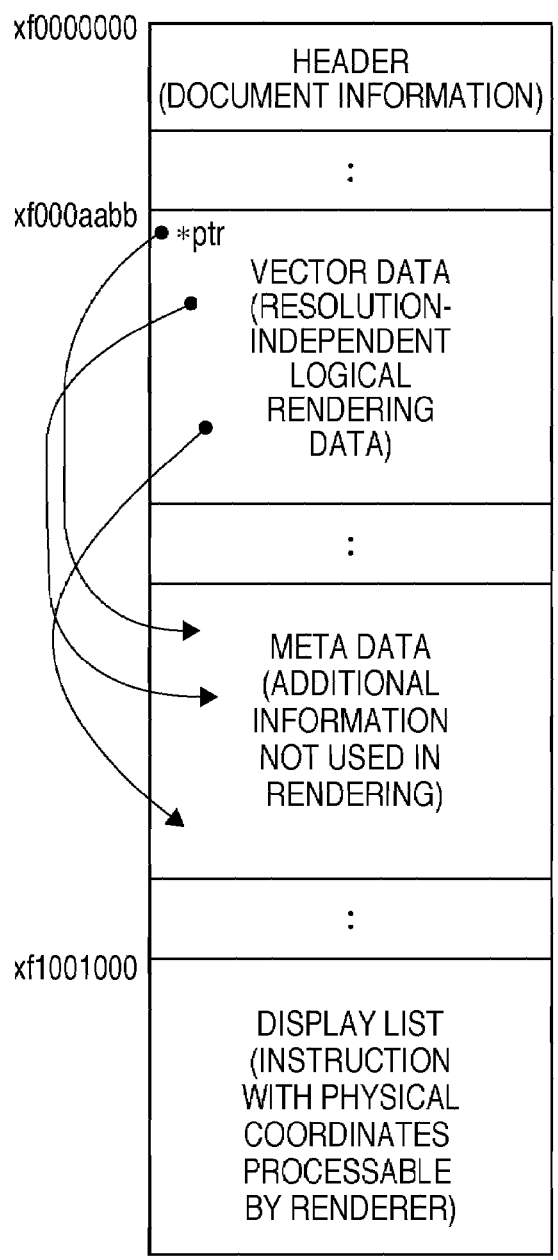
FIGS. 14A and 14B depict views showing how the data structure illustrated in FIG. 12 is disposed in memory and in a file.
Figure 14B:
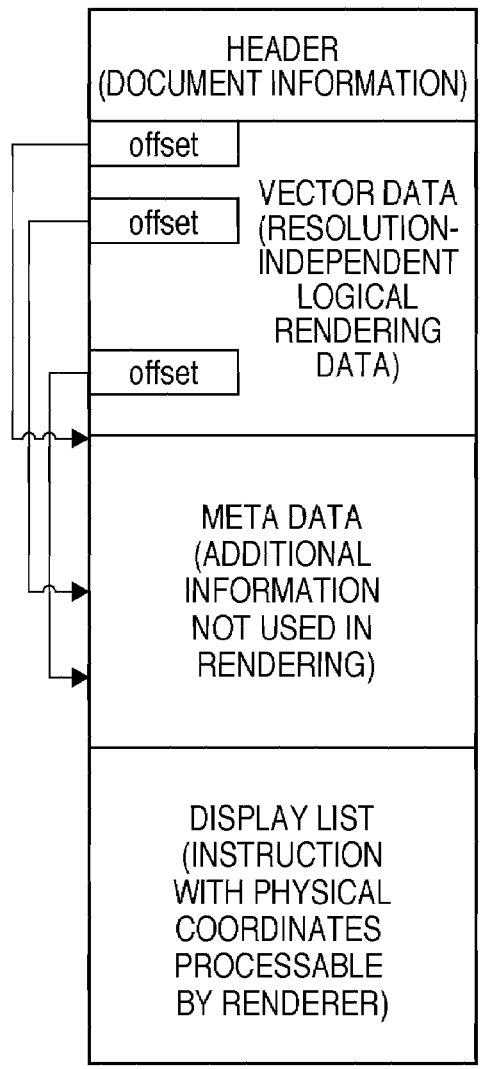

FIGS. 14A and 14B depict views explaining how the data structure illustrated in FIG. 12, for example, is disposed in memory and in a file.

FIG. 14A illustrates the disposal of a document in memory. Here, the vector data region, the meta data region and the DL region of the document are disposed in arbitrary addresses in memory.

FIG. 14B illustrates the disposal of a document in a file. Here, the vector data region, the meta data region and the DL region of the document are serialized in a single file.

The process described above involves PDL data being analyzed using software in the MFP 1000, developed into bitmap data, and printed. Incidentally, if the MFP 1000 does not retain character font information, character information needs to be transmitted to the MFP 1000 as PDL data after having been developed into image data by a printer driver on the host computer side, as noted above. However, in this case, character recognition must be performed on the bitmap data to acquire the character string information if meta data is to be generated with the above method in addition to generating vector data based on PDL data received by the MFP 1000. This is because the character string information will be lost since the character information included in the application data on the host computer side will be transmitted to the MFP 1000 after having been developed into image data by the printer driver. Consequently, if the characters are not correctly recognized with the character recognition in the MFP 1000, the characters shown by the character string information retained as the meta data of the document may differ from the characters included in the actual image.

In view of this, in the first embodiment, the following process is performed when developing application data created by an application to generate image data in an image processing apparatus (e.g., personal computer (PC)) connected to an MFP. That is, an image processing apparatus (PC) of the first embodiment, in the case of generating image data by developing application data created by an application, acquires information included in the application data but not in the image data generated based on the application data. The image processing apparatus then adds the acquired information to the generated image data as additional information of the image data. The image processing apparatus further transmits the image data to which the additional information has been added to an external device (MFP). Note that an application as described below denotes an application used in document creation, table calculations and the like.

Here, the case where a host computer (PC) and a printing apparatus (printer) are connected via a network will be described. Note that the mode of connection between the host computer and the printing apparatus is not limited to the network described here, with it being possible to employ a Centronics interface, infrared communication, wireless communication, a USB, an interface defined by IEEE 1394, or the like.

FIG. 15 depicts a view illustrating a functional configuration of a printer driver 1501 in a printing system in which print data is transmitted from a PC 1550 that functions as an image processing apparatus to a printer 1520 (for example, MFP 1000) and printed in the first embodiment. In FIG. 15, a CPU 1531 activates the system of the PC 1550 based on boot programs stored in a ROM 1535. The CPU 1531 then reads out, on this system, various control programs stored in the ROM 1535, and executes various processes with a RAM 1532 as a work area. A console unit 1533 receives an instruction from a user and notifies the instruction content to the CPU 1531. A network interface 1534 controls data communication with an external device (e.g., MFP) on the network of the PC 1550, the printer 1520 and the like.

Further, in FIG. 15, the reference numeral 1500 denotes an operating system (OS) that controls the PC 1550. The printer driver 1501 is software for controlling the printer 1520 and operates on the OS. The user interface 1502 provides, via the console unit 1533, an interface for receiving an instruction for image data based on application data created using an application provided in the PC 1550 to be transmitted to the printer 1520 and printed or an instruction for the image data to be saved. A print controller 1504 receives a rendering command designated by an application, and creates print data that can be printed by the printer 1520. An application information acquisition section 1510 acquires information relating to the application that creates the application data. This denotes information on the product name, version and the like of the application. A host information acquisition section 1512 acquires setting information. This setting information is information set by the user interface 1502, and includes paper orientation and size, the number of copies, and whether single-sided or double-sided printing is designated when printing with the printer 1520. A rendering command acquisition section 1511 acquires a rendering command. This rendering command is a command for line rendering, bitmap rendering or the like, and includes various parameters. Data required for rendering may be obtained using a service function of the OS, and this information obtained using a service function is also used in vectorization in the printer 1520. A print data generation section 1514 generates image data by developing application data. As aforementioned, if character font information is not retained on the MFP side, character information included in the application data is developed into image data by the printer driver 1501. Note that while information included in the application other than character information is assumed to be described in accordance with PDL and transmitted to the MFP 1000 rather than being developed into image data, information other than character information may also be transmitted after having being developed into image data. A meta data generation section 1513 generates meta data based on information acquired with the application information acquisition section 1510, the host information acquisition section 1512 and the rendering command acquisition section 1511. That is, the meta data generation section 1513 acquires information included in application data but not in image data generated based on the application data, and generates meta data based on this information. A print command controller 1503 converts the print data created by the print data generation section 1514 and the meta data generated by the meta data generation section 1513 into print commands compatible with the printer 1520.

Meta data generated by the meta data generation section 1513 is added to image data generated by the print data generation section 1514 as additional information of the image data. The image data to which the additional information has been added is then output to the printer 1520 via the network interface 1534.

Note that meta data created by the meta data generation section 1513 of the printer driver 1501 and meta data created by the meta data generator 403 of the MFP 1000 are merged in the MFP 1000. That is, meta data created by the meta data generation section 1513 of the printer driver 1501 is used in data retrieval and vectorization together with meta data created by the meta data generator 403 of the MFP 1000.

Figure 16:
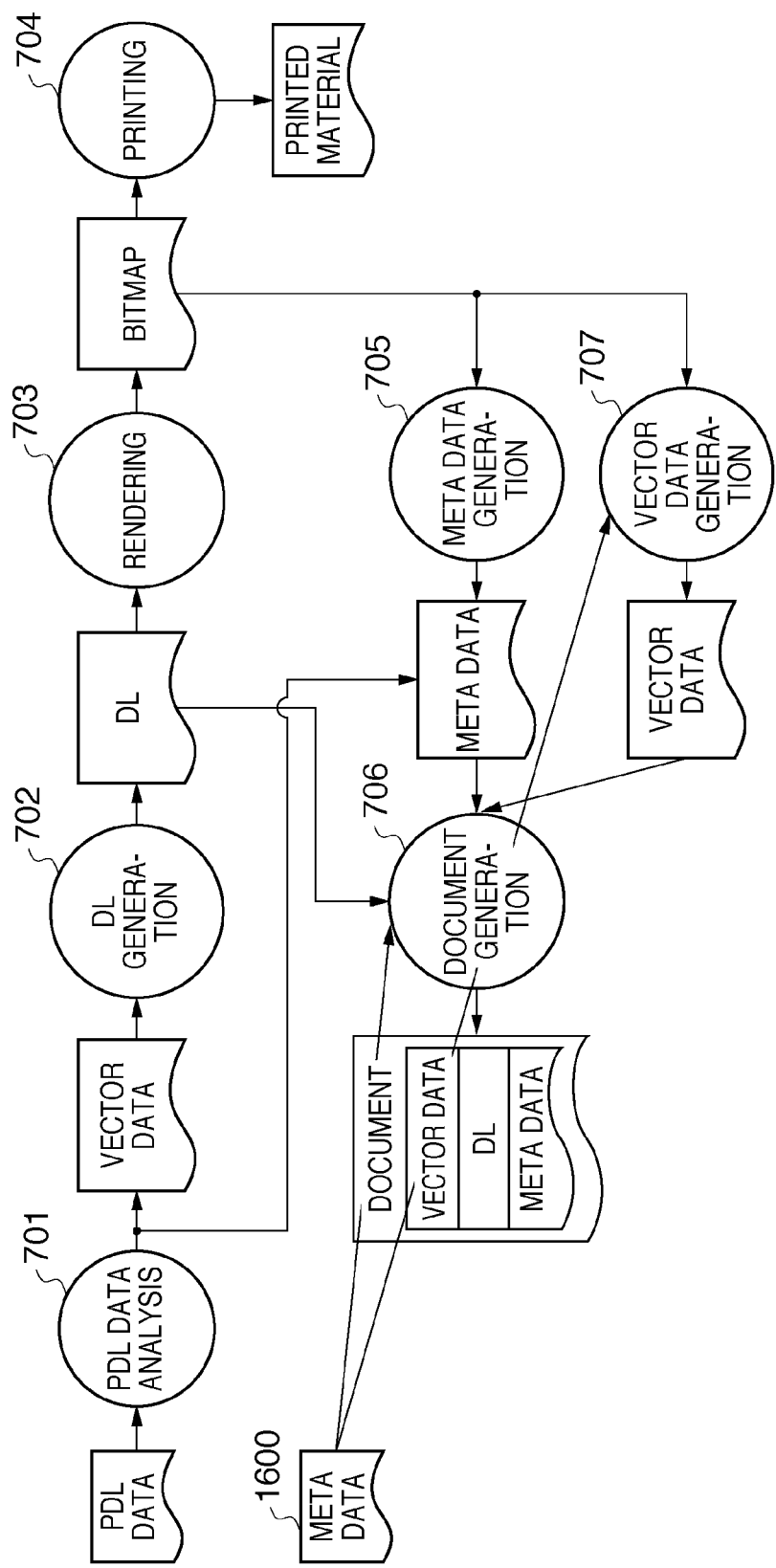
FIG. 16 depicts a view illustrating the processing flow for generating and printing a document from PDL data using meta data generated by a printer driver according to the first embodiment.

FIG. 16 depicts a view illustrating the processing flow for generating and printing a document based on PDL data in the MFP 1000, using meta data generated by the printer driver 1501. Here, portions common with the aforementioned FIG. 7 are shown with the same reference numerals, and description thereof will be omitted.

Here, meta data 1600 generated by the above-mentioned printer driver 1501 is merged with meta data generated from bitmap data obtained by rendering PDL data to generate a document. This meta data 1600 is used for retrieving of this document and the like. Vector data showing content that closely approximates the original application data can be obtained in the MFP 1000 by vectorizing the PDL data with reference to the meta data 1600 generated by the printer driver 1501.

Figure 17:
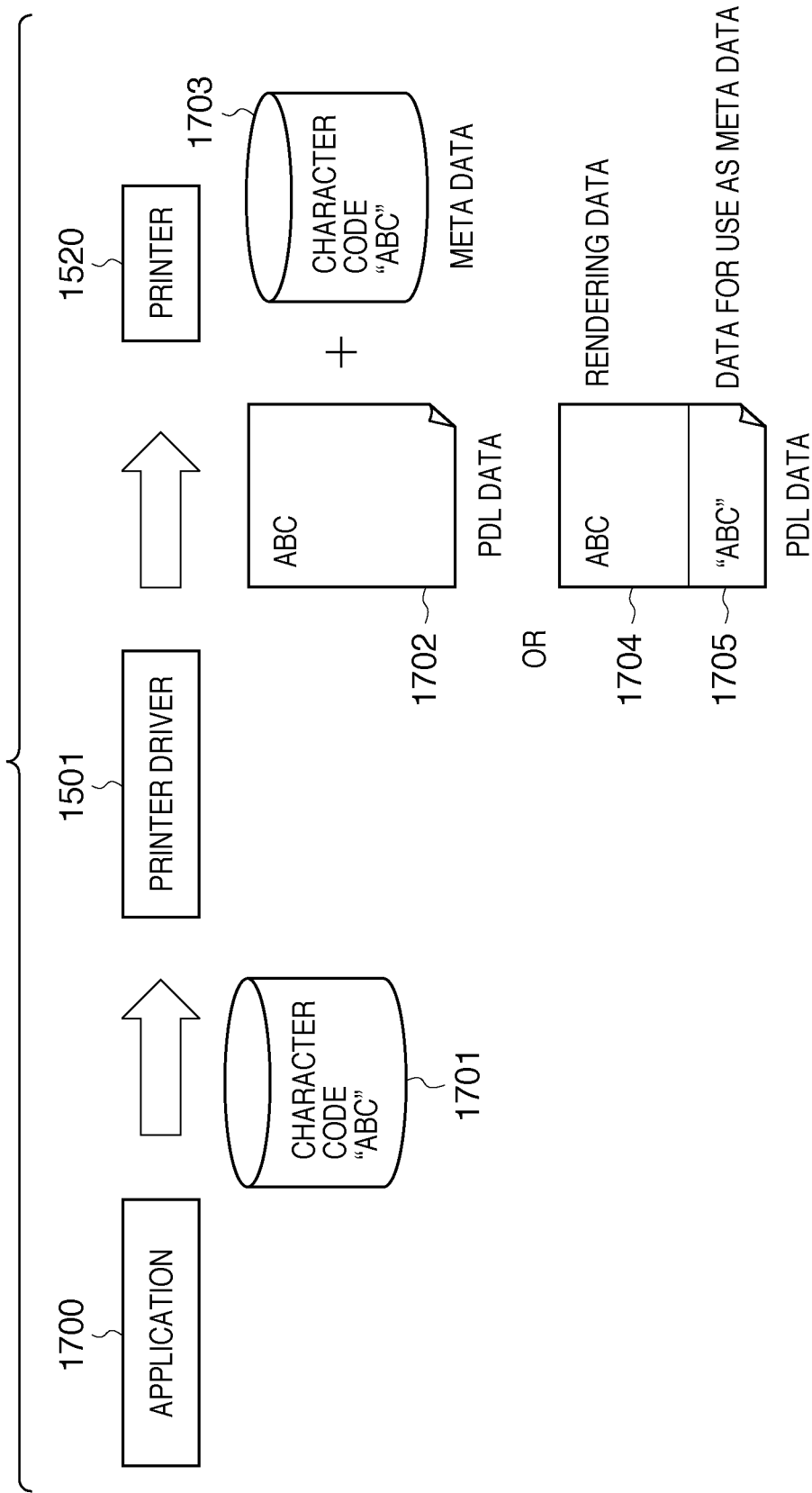
FIG. 17 depicts a view illustrating a meta data generation process by the printer driver according to the first embodiment.

FIG. 17 depicts a view illustrating a meta data generation process by the printer driver 1501.

PDL data 1702 and meta data 1703 are generated by the printer driver 1501 from application data from an application 1700 and host information 1701. That is, in the case where the "job processing method" is "save" when developing application data to generate image data, the printer driver 1501 acquires information included in the application data and generates the meta data 1703. The meta data 1703 is transmitted to the printer 1520 together with the PDL data 1702. Note that meta data 1705 may at this time be merged with rendering data 1704 and stored in the PDL data 1702. The meta data 1703 generated by the printer driver 1501 can thus be used when retrieving a document saved in the box of the printer 1520.

As noted above, some printers (MFPs) do not retain character font information, in which case the application data is transmitted to the printer after having been developed into image data on the host computer side. However, character string information may be lost when generating image data based on application data in this case. In the case where, having performed character recognition on bitmap data on the printer side, a character string included in the bitmap data was misrecognized, data retrieval may have been unsuccessful when performed using meta data created based on these characters. In contrast, in the first embodiment, the following is made possible in the case where, for example, the "job processing method" is "save" (very likely that a search will subsequently be performed) by configuring the image processing apparatus as described above. That is, the image processing apparatus, when developing application data to generate image data, acquires character information (consists of at least some of the character codes, and is not included in the developed image data) included in the application data and adds the acquired character information as meta data (additional information). This meta data is used for document retrieval and the like in the printer.

Note that in the first embodiment, if the "job processing method" is "print", the time required for printing is shortened by not assigning meta data.

In the above first embodiment, an example that involves transmitting meta data 1703 created by the printer driver 1501 to the MFP 1000 and using this meta data for document retrieval in the MFP 1000 was described. In the second embodiment, an example that involves using meta data generated by a printer driver when performing vectorization in the MFP 1000 will be described. Note that since the configurations of the MFP, PC and system according to the second embodiment are the same as the foregoing first embodiment, description thereof will be omitted.

Some printers (MFPs) are incompatible with the transparency and gradation attributes of an image, so for these printers, objects need to be transmitted to the printers after having been developed into image data. Information relating to the transparency or gradation attributes of an image may thus be lost when developing application data to generate image data. The overlapping portions of transmissive images may thereby end up being separated to create a gap, when image data generated based on application data that includes objects having transparency or gradation attributes is vectorized in the printer.

Figure 18:
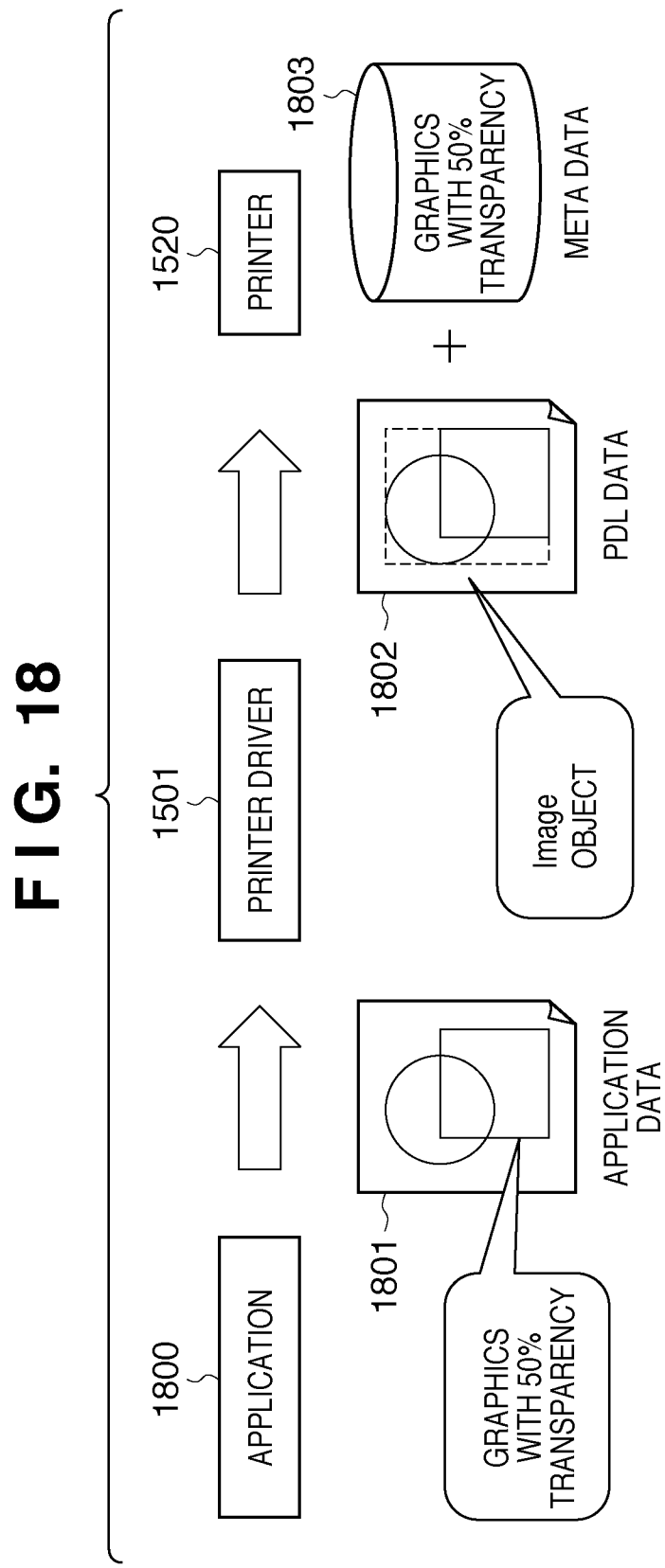
FIG. 18 depicts a view illustrating a second embodiment of the present invention.

FIG. 18 depicts a view explaining the second embodiment of the present invention.

In FIG. 18, application data 1801 created with an application 1800 includes graphics attribute information indicating that the region where a circular object and a square object overlap has 50% transparency. This graphics attribute information is lost when the printer driver 1501 develops the application data 1801 into image data. At this time, the graphics attribute information that will be lost when the application data is developed into image data is acquired and added to the generated image data (PDL data 1802) as meta data 1803. In the printer 1520 (MFP 1000), the PDL data 1802 is developed into bitmap data, and the meta data 1803 is referenced when generating vector data from this bitmap data. That is, using trapping or the like when performing vectorization enables the transparent graphics portion to be correctly recognized, since misrecognition of the region where the circular object and the square object overlap as another object does not occur.

In a third embodiment, an example in which vectorization precision is improved using host information (application name, version) stored in meta data by the printer driver 1501 will be described. Note that since the configurations of the MFP, PC and system according to the third embodiment are the same as the foregoing first embodiment, description thereof will be omitted.

Some applications implement everything from color processing to halftone processing, for example. The fill pattern after halftone processing will thus differ from a general application that uses a pattern integral to the printer (MFP). However, to what extent the features of the application that created the application data can be realized will depend on the printer. Conventionally, uniform processing was performed, since information on the features of an application could not be used when vectorizing a rendering image in a printer.

Consequently, if vectorization is performed in a printer, even on data that has undergone halftone processing by an application such as described above, the vectorization will end up being performed using the a specific pattern integral to that printer.

In view of this, the printer driver 1501 acquires this information and adds the acquired information to the image data as meta data to supply to the printer. This meta data can thereby be referenced during vectorization, enabling vectorization to be executed in line with the features of the application.

Figure 19:
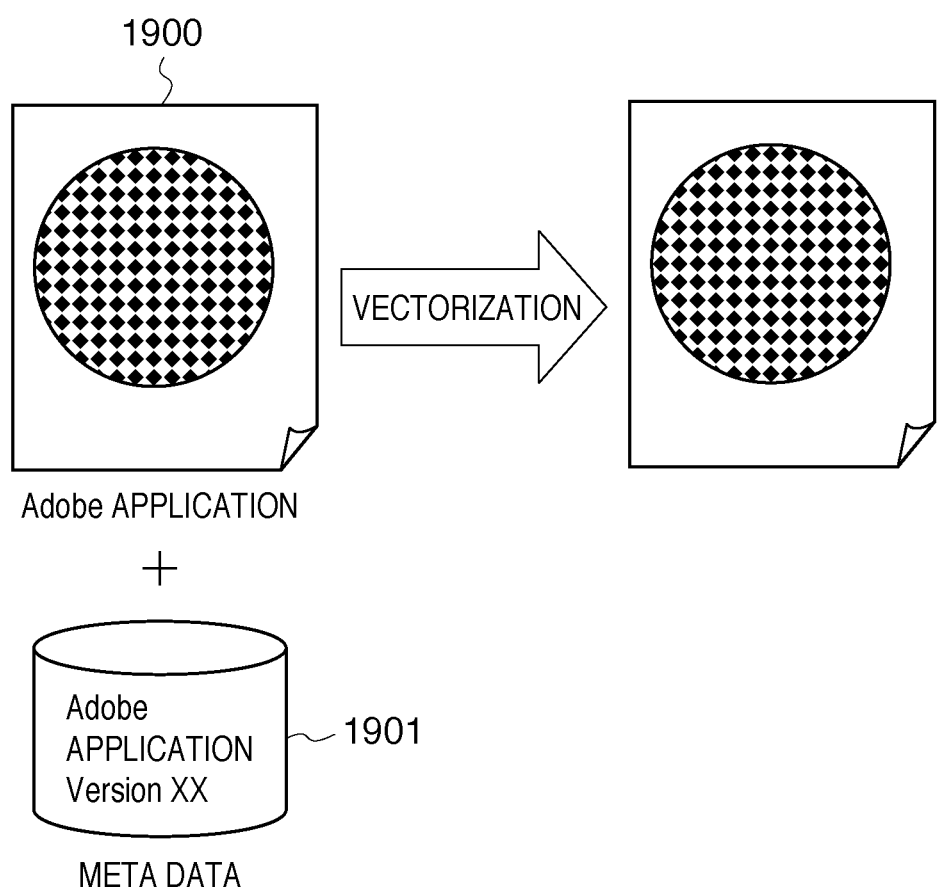
FIG. 19 depicts a view illustrating operations according to a third embodiment of the present invention.

FIG. 19 depicts a view explaining operations according to the third embodiment of the present invention.

For example, the portion that has undergone halftone processing by an application such as described above is transmitted to the MFP 1000 after being added to application data 1900 as meta data 1901. The printer (MFP) is thereby able to perform vectorization using the exact same pattern with which the application executed the halftone processing, rather than a pattern integral to the printer, by referencing this meta data when vectorizing the application data.

Note that, in this case, a "recreate application features" button may be provided on the UI of the printer, enabling the user to designate whether to use the pattern with which the application executed the halftone processing or a pattern integral to the printer.

Figure 20:
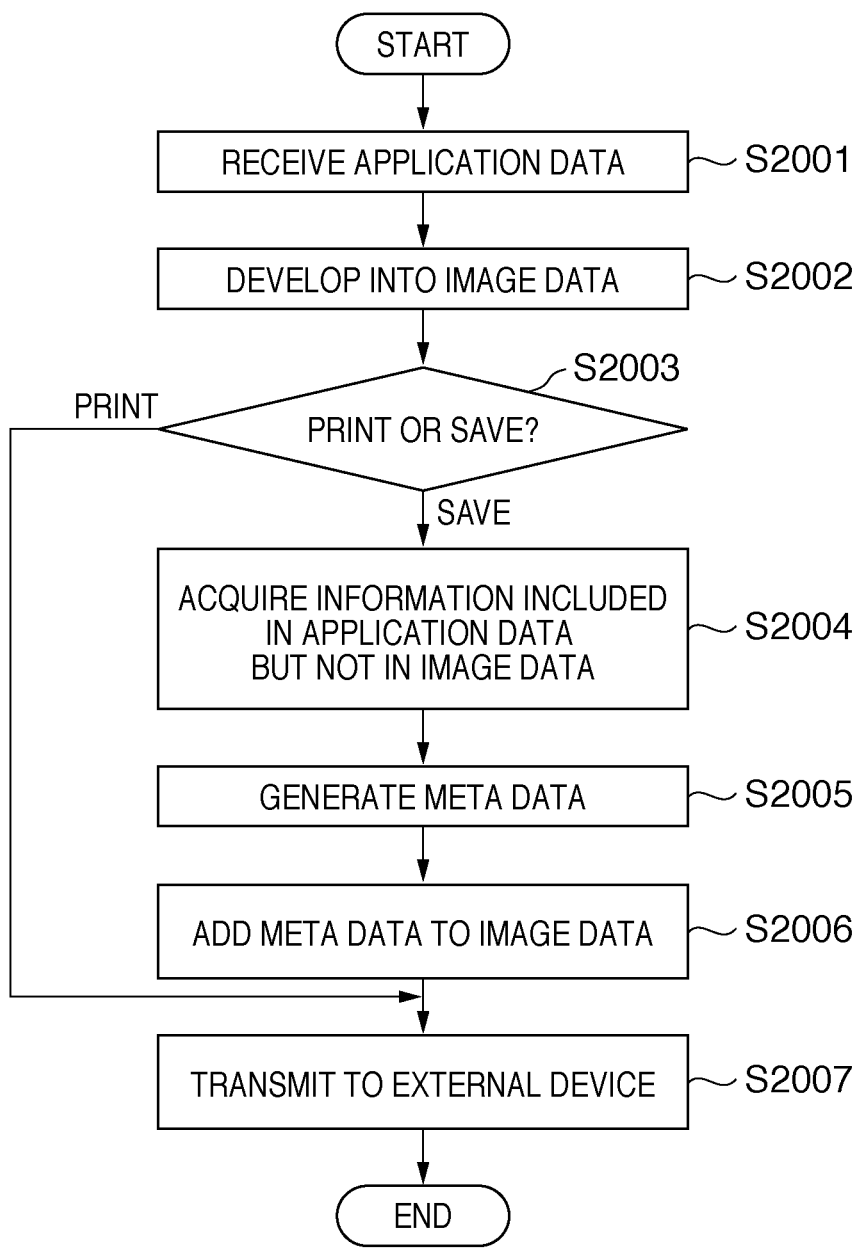
FIG. 20 is a flowchart explaining processing by a printer driver according to the third embodiment.

FIG. 20 is a flowchart explaining processing by the printer driver 1501 according to the third embodiment. Note that control of this series of operations is assumed to be executed by the CPU 1531 of the PC 1550 based on programs stored in the ROM 1535.

Firstly, in step S2001, application data created by an application is received. Next, the processing proceeds to step S2002, where the received application data is developed to generate image data. In the next step S2003, it is determined whether the instruction from the user requests that the MFP 1000 print the image data or save the image data. As a result of this determination, if determined that the instruction from the user requests that the MFP 1000 save the image data, the processing proceeds to step S2004. In step S2004, information (some of the character codes, the attribute information of objects, information relating to the application that created the application data, etc.) included in the application data created by the application but not in the developed image data is acquired. This processing is executed by the application information acquisition section 1510, the host information acquisition section 1512, the rendering command acquisition section 1511, and the meta data generation section 1513 shown in FIG. 15. Then, in step S2005, meta data is generated based on the information acquired in step S2004. Next, the processing proceeds to step S2006, where the meta data generated in step S2005 is added to the image data generated in step S2002. The processing then proceeds to step S2007 where the image data to which the meta data has been added is output to an external device (MFP 1000). Note that if it is determined in step S2003 that the instruction from the user requests that the MFP 1000 print the image data, steps S2004 to S2006 are omitted, and the processing proceeds to step S2007. That is, in this case image data to which meta data has not been added is transmitted to an external device (printer) such as the MFP 1000.

Note that in the above description, an example was given in which application data is transmitted to an MFP as PDL data after having been developed into image data by the printer driver on the host computer side. However, in the case where image data is transmitted from a host computer to an MFP, the image data may be transmitted in a data format other than PDL data. In other words, the above configuration may, for example, be employed in a host base printing system where all application data is transmitted to the MFP after having been developed into image data (for example, bitmap data) on the host computer side. That is, the above configuration can be applied if part of the information included in the application data will be lost due to application data being developed into image data on the host computer side.

Further, while an example was given in the above description in which the printer driver on the host computer side is provided with a configuration for acquiring information that will be lost due to application data being developed into image data and adding this information to the image data as additional data, other modes are also possible. That is, an MFP can also be provided with the configuration provided in the printer driver. In other words, when application data created by an application provided in a host computer or an MFP is developed into image data in an MFP and output, information that will be lost as a result of this developing process may be added as additional information of the image data.

Note that the present invention can be achieved by a software program that realizes the functions of the foregoing embodiments being directly or remotely supplied to a system or an apparatus, and a computer in the system or apparatus reading out and executing the supplied program. In this case, the mode need not be a program as long as the functions of the program are provided.

Consequently, the present invention is also realized by the actual program code installed on the computer, in order to realize the functions and processes of the present invention by computer. In other words, the claims of the present invention also encompass the actual computer program for realizing the functions and processes of the present invention. In this case, any mode of program, such as object code, a program executed by an interpreter or script data supplied to an operating system, is acceptable, as long as the functions of the program are provided.

A variety of recording media can be used for supplying the program. These include floppy® disk, hard disk, optical disk, magneto-optical disk, MO, CD-ROM, CD-R, CD-RW, magnetic tape, nonvolatile memory card, ROM, and DVD (DVD-ROM, DVD-R).

Otherwise, the program can be supplied by connecting to a website on the Internet using the browser of a client computer, and downloading the program from the website to a recording medium such as a hard disk. In this case, the actual computer program of the present invention or a compressed file including an auto-install function may be downloaded. Supply can also be realized by dividing the program code constituting the program of the present invention into a plurality of files and downloading the respective files from different websites. In other words, the claims of the present invention also encompass a World Wide Web (WWW) server that allows a plurality of users to download program files for realizing the functions and processes of the present invention by computer.

A mode where the program of the present invention is distributed to users in encrypted form stored on a computer-readable storage medium such as a CD-ROM is also acceptable. In this case, users that meet a prescribed requirement are allowed to download decryption key information from a website via the Internet, and the encrypted program is installed on a computer in executable form using this key information.

The functions of the foregoing embodiments can be realized in modes other than those described above, as a result of a computer executing the read program. For example, an OS or the like running on the computer can perform part or all of the actual processing based on instructions in the program, with the functions of the foregoing embodiments being realized as a result of this processing.

Further, the program read out from the recording medium may also be written to a memory provided in a function expansion board inserted in the computer or a function expansion unit connected to the computer. In this case, a CPU or the like provided in the function expansion board or the function expansion unit subsequently performs part or all of the actual processing based on instructions in the program, with the functions of the foregoing embodiments being realized as a result of this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-043551, filed Feb. 25, 2008, which is hereby incorporated by reference herein in its entirety.

What is claimed is:

1. An image processing apparatus comprising:
a generation unit configured to generate bitmap image data by interpreting application data created by an application;
an acquisition unit configured to acquire text information included in the application data but not included in the generated bitmap image data;
an addition unit configured to add the text information acquired by the acquisition unit to the generated bitmap image data as attribute information of the generated bitmap image data; and
a transmission unit configured to transmit the generated bitmap image data, to which the text information is added by the addition unit, to a printer when the generated bitmap image data is to be saved in the printer, and transmit the generated bitmap image data, to which the text information is not added, to the printer when the generated bitmap image data is to be printed by the printer,
wherein the text information added by the addition unit is able to be used at the printer in order to retrieve the generated bitmap image data saved in the printer.

2. The image processing apparatus according to claim 1, wherein the text information includes one or more character codes which correspond to the characters included in the generated bitmap image data.

3. The image processing apparatus according to claim 1, wherein the transmission unit transmits the generated bitmap image data to the printer via a network.

4. A control method of an image processing apparatus, comprising:
generating bitmap image data by interpreting application data created by an application;
acquiring text information included in the application data but not included in the generated bitmap image data;
adding the acquired text information to the generated bitmap image data as attribute information of the generated bitmap image data;
transmitting the generated bitmap image data to which the text information is added to a printer when the generated bitmap image data is to be saved in the printer; and
transmitting the generated bitmap image data to which the text information is not added to the printer when the generated bitmap image data is to be printed by the printer,
wherein the added text information is able to be used at the printer in order to retrieve the generated bitmap image data saved in the printer.

5. The control method according to claim 4, wherein the text information includes one or more character codes which correspond to the characters included in the generated bitmap image data.

6. The control method according to claim 4, wherein the generated bitmap image data is transmitted to the printer via a network.

7. A non-transitory computer-readable storage medium storing a computer-executable program, the computer-executable program causing a computer to perform a method comprising:
generating bitmap image data by interpreting application data created by an application;
acquiring text information included in the application data but not included in the generated bitmap image data;
adding the acquired text information to the generated bitmap image data as attribute information of the generated bitmap image data;
transmitting the generated bitmap image data, to which the text information is added, to a printer when the generated bitmap image data is to be saved in the printer; and transmitting the generated bitmap image data, to which the text information is not added, to the printer when the generated bitmap image data is to be printed by the printer,
wherein the added text information is able to be used at the printer in order to retrieve the generated bitmap image data saved in the printer.

\* \* \* \* \*